(12) United States Patent
Kawanoue et al.

(10) Patent No.: US 10,187,379 B2
(45) Date of Patent: Jan. 22, 2019

(54) CONTROL APPARATUS AND CONTROL APPARATUS SYSTEM

(71) Applicant: OMRON Corporation, Kyoto-shi, Kyoto (JP)

(72) Inventors: Shinsuke Kawanoue, Kyoto (JP); Takehiko Hioka, Otsu (JP); Yutaka Abe, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 34 days.

(21) Appl. No.: 15/123,148

(22) PCT Filed: Jan. 15, 2015

(86) PCT No.: PCT/JP2015/050956
§ 371 (c)(1),
(2) Date: Sep. 1, 2016

(87) PCT Pub. No.: WO2015/136972
PCT Pub. Date: Sep. 17, 2015

(65) Prior Publication Data
US 2017/0063835 A1    Mar. 2, 2017

(30) Foreign Application Priority Data
Mar. 14, 2014    (JP) .................................. 2014-052798

(51) Int. Cl.
*H04L 29/06* (2006.01)
*G06F 21/57* (2013.01)
(Continued)

(52) U.S. Cl.
CPC ........ *H04L 63/083* (2013.01); *G05B 19/0426* (2013.01); *G05B 19/056* (2013.01);
(Continued)

(58) Field of Classification Search
CPC ........... G06F 21/57; G06F 8/61; H04L 63/061
(Continued)

(56) References Cited

U.S. PATENT DOCUMENTS 8,090,960 B2    1/2012 Okawa
8,209,547 B2 *  6/2012 Shimizu ................ G06F 21/121
                                         380/44
(Continued)

FOREIGN PATENT DOCUMENTS

CN    1263305 A    8/2000
CN    1630332 A    6/2005
(Continued)

OTHER PUBLICATIONS

Yoshinori, ECU code output method, Journal of Denso Technical Disclosure, Jan. 15, 1999, p. 59, Denso Corporation, Japan (Relevance is indicated in the JPOA issued on Jan. 23, 2018).
(Continued)

*Primary Examiner* — Jason K Gee
*Assistant Examiner* — Dereena T Cattungal
(74) *Attorney, Agent, or Firm* — Metrolexis Law Group, PLLC

(57) ABSTRACT

Unauthorized installation of software is prevented even at a production site at which software cannot be installed through a communication line. The memory card stores: additional software including a software ID; a recording medium ID; and encrypted information generated by encrypting the software ID, using the recording medium ID as a key. The controller performs the steps of: obtaining the encrypted information from the memory card; obtaining the recording medium ID from the memory card; obtaining the software ID by decrypting the encrypted information, using the recording medium ID as a key; obtaining the software ID from the additional software, comparing the decrypted soft-
(Continued)

ware ID and the software ID obtained from the additional software; and storing the additional software in the storage when the comparison is successful.

4 Claims, 20 Drawing Sheets

(51) Int. Cl.
*G05B 19/042* (2006.01)
*G06F 8/61* (2018.01)
*G05B 19/05* (2006.01)

(52) U.S. Cl.
CPC .............. *G06F 8/61* (2013.01); *G06F 21/57* (2013.01); *H04L 63/061* (2013.01); *G05B 2219/24124* (2013.01); *G05B 2219/25205* (2013.01); *G06F 2221/2107* (2013.01)

(58) Field of Classification Search
USPC ........................................................ 713/171
See application file for complete search history.

(56) References Cited

U.S. PATENT DOCUMENTS

| | | | | |
|---|---|---|---|---|
| 2006/0168580 A1* | 7/2006 | Harada | ................... | G06F 21/10 717/174 |
| 2007/0033418 A1* | 2/2007 | Okawa | ................... | G06F 21/10 713/192 |
| 2007/0055863 A1 | 3/2007 | Kraki et al. | | |
| 2007/0198795 A1 | 8/2007 | Harada | | |
| 2009/0073492 A1 | 3/2009 | Okabe | | |
| 2009/0327359 A1* | 12/2009 | Aoyama | .......... | G11B 20/00086 |
| 2010/0325734 A1 | 12/2010 | Etchegoyen | | |
| 2012/0117380 A1 | 5/2012 | Herberth et al. | | |
| 2017/0097900 A1* | 4/2017 | Fielder | ................ | G06F 12/1408 |

FOREIGN PATENT DOCUMENTS

| | | |
|---|---|---|
| EP | 1507186 B1 | 10/2011 |
| EP | 2672414 A1 | 12/2013 |
| JP | H4-136702 U | 12/1992 |
| JP | 2001-034822 A | 2/2001 |
| JP | 2003-167606 A | 6/2003 |
| JP | 2004-326874 A | 11/2004 |
| JP | 2005-301969 A | 10/2005 |
| JP | 2007-41650 A | 2/2007 |
| WO | 2004/075092 A1 | 9/2004 |

OTHER PUBLICATIONS

Japanese Office Action dated Jan. 23, 2018 in a related Japanese patent application.
Chinese Office Action (CNOA) dated May 14, 2018 in a counterpart Chinese patent application.

* cited by examiner

CONTROL APPARATUS AND CONTROL APPARATUS SYSTEM

TECHNICAL FIELD

The present invention relates to a control apparatus and a control apparatus system. In particular, the invention relates to a control apparatus in which additional software is installed from a recording medium connected to the control apparatus, and to a control apparatus system in which the control apparatus is used.

BACKGROUND ART

In some programmable controllers, a security measure is taken to prevent a fraudulent operation based on leakage of a password. For example, in a known technique, a memory card having a user authentication table is attached on a programmable controller in order to control access to the programmable controller from a tool. Further, a login request command in which user login information is written is transmitted from the tool to the programmable controller, and the programmable controller is allowed to be accessed when IDs and passwords of the both are identical (for example, see Patent Document 1).

PRIOR ART DOCUMENT

Patent Document

Patent Document 1: Japanese Unexamined Patent Publication No. 2003-167606

SUMMARY OF THE INVENTION

Problems to be Solved by the Invention

In an aspect of using a programmable controller, a customer purchases an additional software and installs the software into the programmable controller, in some cases. In those cases, the installation is normally performed from the Internet by using a personal computer; however, in some production sites at which a programmable controller is used, no personal computer is allowed to be brought in or a communication line is not provided.

An object of the present invention is to prevent unauthorized installation of software at a production site at which software cannot be installed through a communication line.

Means for Solving the Problem

In the following, there will be described a plurality of aspects as a measure for solving the problem. These aspects can be combined with each other as needed.

A control apparatus according to a perspective of the present invention is used with a recording medium connected thereto. The recording medium stores additional software including software identification information, recording medium identification information, and encrypted information generated by encrypting the software identification information, using the recording medium identification information as a key. The control apparatus is equipped with a storage, a recording medium, and a controller which can access the storage.

The controller can perform the steps of:
obtaining the encrypted information from the recording medium;
obtaining the recording medium identification information from the recording medium;
obtaining the software identification information by decrypting the encrypted information, using the recording medium identification information as a key;
obtaining the software identification information from the additional software;
comparing the decrypted software identification information and the software identification information obtained from the additional software; and
storing the additional software in the storage if the decrypted software identification information agrees with the software identification information obtained from the additional software, as a result of the comparison between them.

In the control apparatus, if the decrypted software identification information agrees with the software identification information obtained from the additional software as a result of the comparison between them, the additional software is stored in the storage. As an example of the storing, the additional software is moved from the recording medium to the storage and is made usable. Further, as another example of the storing, the additional software is temporarily moved from the recording medium before the determination step, and the additional software is made usable if the additional software is determined to be usable.

As described above, the additional software is made usable only in the case that the decrypted software identification information agrees with the software identification information obtained from the additional software, as a result of the comparison between them. Thus, only in the case that the recording medium storing the correct encrypted information is used, the additional software is installed in the control apparatus and is made usable. That is, in the cases, for example, that there is no encrypted information, that the medium identification information as the key of the encrypted information is different from the medium identification information of the recording medium, or that the software identification information as the content of the encrypted information is different from the software identification information of the additional software, the additional software is not allowed to be installed because the additional software is taken as unauthorized installation.

A control apparatus according to another perspective of the present invention is a control apparatus which is used with a recording medium being connected thereto and having the recording medium identification information recorded therein. The control apparatus is equipped with a storage in which additional software including software identification information is stored, and a controller which can access the recording medium and the storage.

The controller can perform the steps of:
obtaining the software identification information from the additional software;
obtaining the recording medium identification information from the recording medium;
generating encrypted information by encrypting the software identification information, using the recording medium identification information as a key;
writing the encrypted information in the recording medium; and
moving the additional software from the storage to the recording medium.

In the present apparatus, the additional software and the encrypted information can be written in the recording medium from the control apparatus. Thus, even if the control apparatus needs to be repaired due to a failure of a part of the functions of the control apparatus, it is possible to save the additional software and the encrypted information from the control apparatus before repairing.

A control apparatus system according to another perspective of the present invention is equipped with the above-described control apparatus and recording medium. The recording medium stores: additional software which includes the software identification information and which is to be executed by the control apparatus; recording medium identification information; and encrypted information generated by encrypting the software identification information, using the recording medium identification information as a key.

An area which is in the recording medium and in which the encrypted information is stored may be configured with to include a file system which can be read by an OS of the control apparatus.

The file system is made such that it is difficult for devices other than the control apparatus to read the area which is in the recording medium and in which the encrypted information is stored, so that the encrypted information is hardly leaked.

Plural pieces of additional software may be disposed in the recording medium.

In the control apparatus, a single recording medium can be used to install plural pieces of additional software into one or more of control apparatuses.

A single piece of additional software may include plural pieces of software identification information. In that case, for a single piece of the additional software, plural pieces of the encrypted information are disposed in the recording medium, corresponding to a number of the plural pieces of the software identification information.

In the control apparatus, based on each combination of the software identification information and the encrypted information, a single piece of additional software can be installed in the control apparatus.

Effect of the Invention

In the control apparatus according to the present invention, the additional software is made usable only in the case that the decrypted software identification information agrees with the software identification information obtained from the additional software, as a result of the comparison between them. Therefore, even at a production site at which software cannot be installed through a communication line, it is possible to prevent unauthorized installation of software.

MODES FOR CARRYING OUT THE INVENTION

Figure 1:
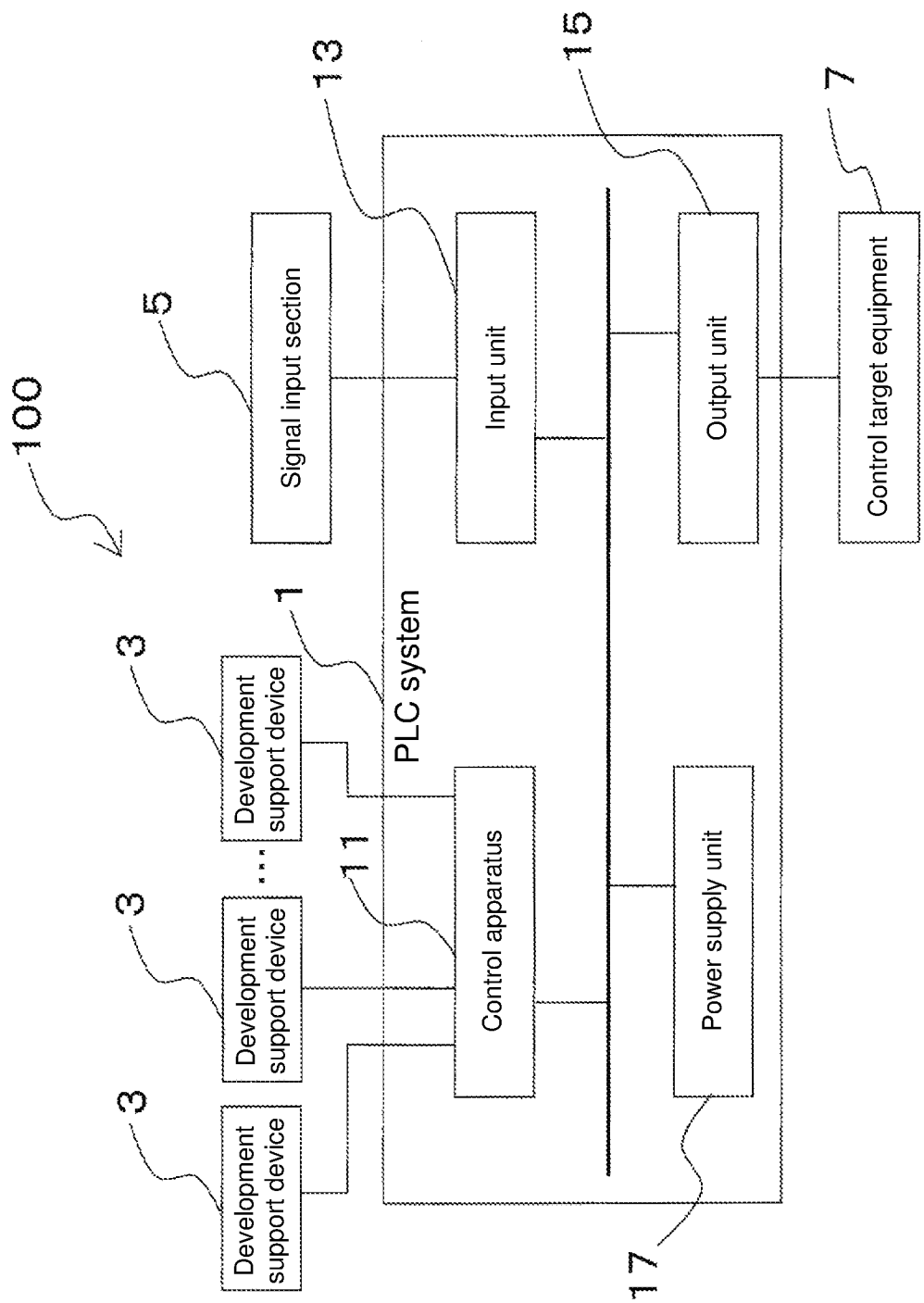
FIG. 1 is a block diagram showing a general structure of a control system.

1. First Embodiment
(1) General Structure of Control System
First, a general structure of a control system according to a first embodiment will be described with reference to FIG. 1. FIG. 1 is a block diagram showing a general structure of the control system. A control system 100 is equipped with a PLC system 1 and a development support device 3.

The PLC system 1 inputs a signal from a signal input section 5 configured with, for example, a sensor or a switch. Further, the PLC system 1 uses, as needed, an input signal from the signal input section 5 to execute a program, thereby calculating an output signal to control a control target equipment 7.

The development support device 3 realizes a various kinds of functions for creating a user program to be used on a control apparatus 11 of the PLC system 1. Further, the number of the development support devices 3 is not limited to one, and any numbers of development support devices 3 may be connected as long as, for example, there are enough numbers of addresses assigned to the development support devices 3.

(2) Configuration of PLC System

Next, a detailed configuration of the PLC system 1 will be described with reference to FIG. 1. The PLC system 1 has the control apparatus 11, an input unit 13, an output unit 15, and a power supply unit 17.

The control apparatus 11 is a CPU unit of the programmable logic controller (PLC).

Further, on the control apparatus 11, a predetermined task is repeatedly executed at a predetermined cycle. The task is a unit of processes including: an I/O refresh process for updating an input variable, based on an input signal from the input unit 13, and updating an output signal to be output to the output unit 15, based on an output variable; and a process for executing a user program and/or a system program. Note that the task may include other processes such as a motion control process or may include only a process for executing a program.

The input unit 13 inputs an input signal from the signal input section 5 such as a sensor or a switch and outputs the input signal to the control apparatus 11. As the input unit 13, it is possible to use an input unit corresponding to the type of the signal fed from the signal input section 5. Specifically, for example, in the case that the signal input section 5 is configured with a thermocouple to measure temperatures, it is possible to use the input unit 13 as an input unit whose input signal is a voltage generated by the thermocouple. Alternatively, for example, in the case that the signal input section 5 is configured with an electric switch, it is possible to use the input unit 13 as an input unit whose input signal is an ON/OFF state of the electric switch.

The output unit 15 outputs an output signal to the corresponding control target equipment 7. With this arrangement, the control apparatus 11 can control the control target equipment 7. As the output unit 15, it is possible to use an output unit corresponding to the type of the output signal. For example, in the case that the control target equipment 7 is a motor and that a position control or the like of the motor is performed, it is possible to use an output unit having a motion controller function. Alternatively, for example, in the case that the control target equipment 7 is an electric furnace, it is possible to use an output unit which outputs a signal to control a relay for controlling the electric furnace (for example, a signal to control an ON/OFF duty factor).

The power supply unit 17 supplies electric power to the control apparatus 11, the input unit 13, and the output unit 15.

Note that the PLC system 1 may be a system in which all the above components are assembled in a single casing, or the PLC system may be made by assembling respective components in a separate casing and connecting the components. In particular, if the input unit 13 and the output unit 15 are made as separate components, it is possible to connect, to the PLC system 1, an intended number of pieces of intended control target equipment and an intended number of intended signal input sections.

(3) Configuration of Control Apparatus

Figure 2:
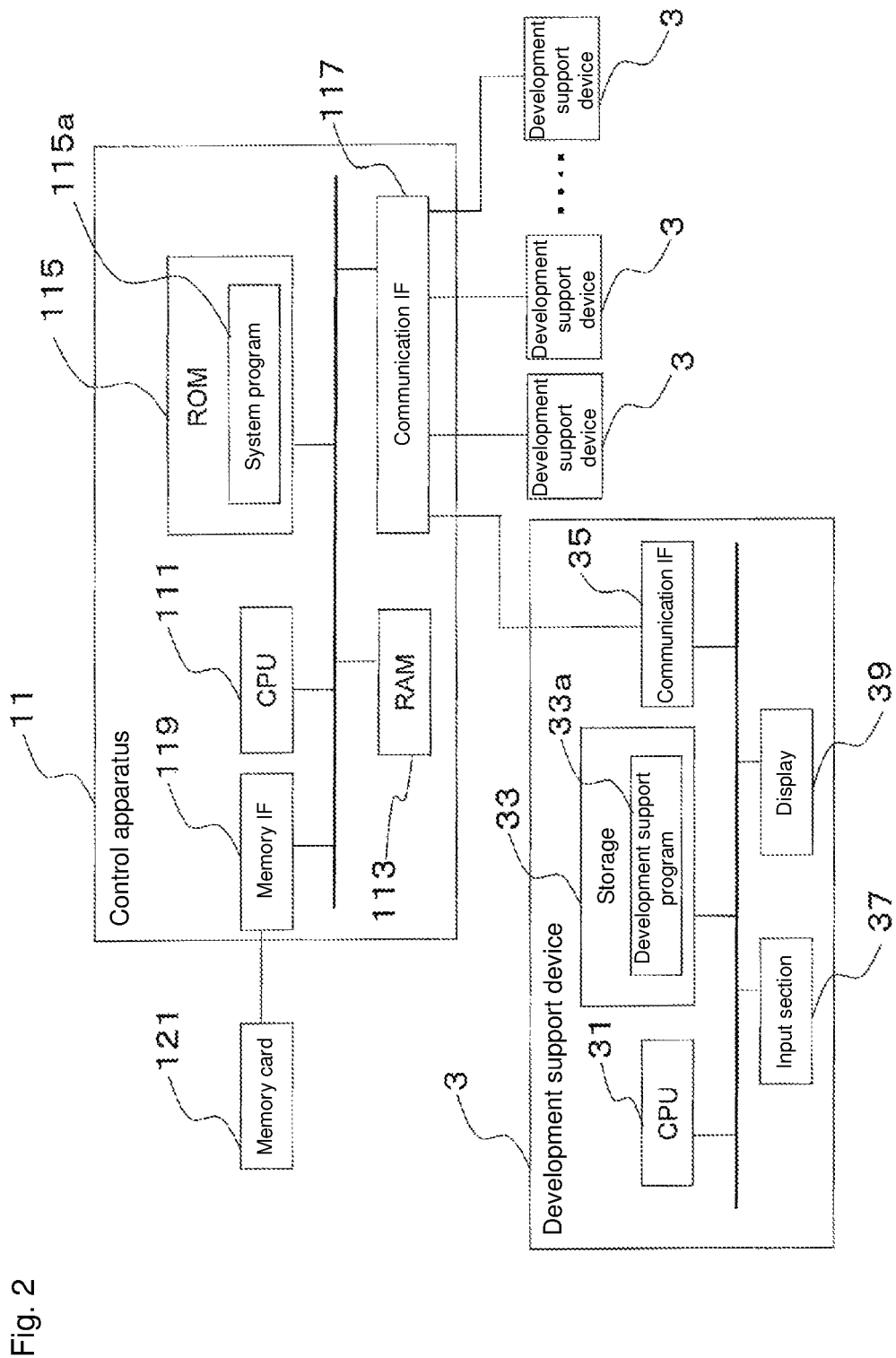
FIG. 2 is a block diagram showing configurations of the control apparatus and a development support device.

Next, a configuration of the control apparatus 11 will be described in detail with reference to FIG. 2. FIG. 2 is a block diagram showing configurations of the control apparatus and the development support device.

In FIG. 2, the control apparatus 11 has a CPU 111, a RAM 113, a ROM 115, and a communication interface 117. Note that in the embodiment, the CPU 111 of the control apparatus 11 shown in FIG. 2 executes a system program 115*a* stored in the ROM 115 to realize a function of the control apparatus 11. The RAM 113 stores the user program.

The control apparatus 11 communicates with the development support device 3 by using the communication interface 117. The communication interface 117 uses, for example, a data communication protocol such as the TCP/IP (Transmission Control Protocol/Internet Protocol) to perform sending and receiving of data.

The control apparatus 11 has a memory interface 119. A memory card 121 to be described later can be connected to the memory interface 119.

(4) Configuration of Development Support Device

Next, a configuration of the development support device 3 will be described in detail with reference to FIG. 2.

The development support device 3 has a CPU 31, a storage 33, a communication interface 35, an input section 37, and a display 39. The storage 33 stores a development support program 33*a*. The CPU 31 executes the development support program 33*a* to realize a function of the development support device 3. The input section 37 is an input unit such as keyboard, a mouse, or a touch panel. The display 39 is a display unit made up of a display using an LCD or an organic EL.

(5) Control Configuration of Control Apparatus

Figure 3:
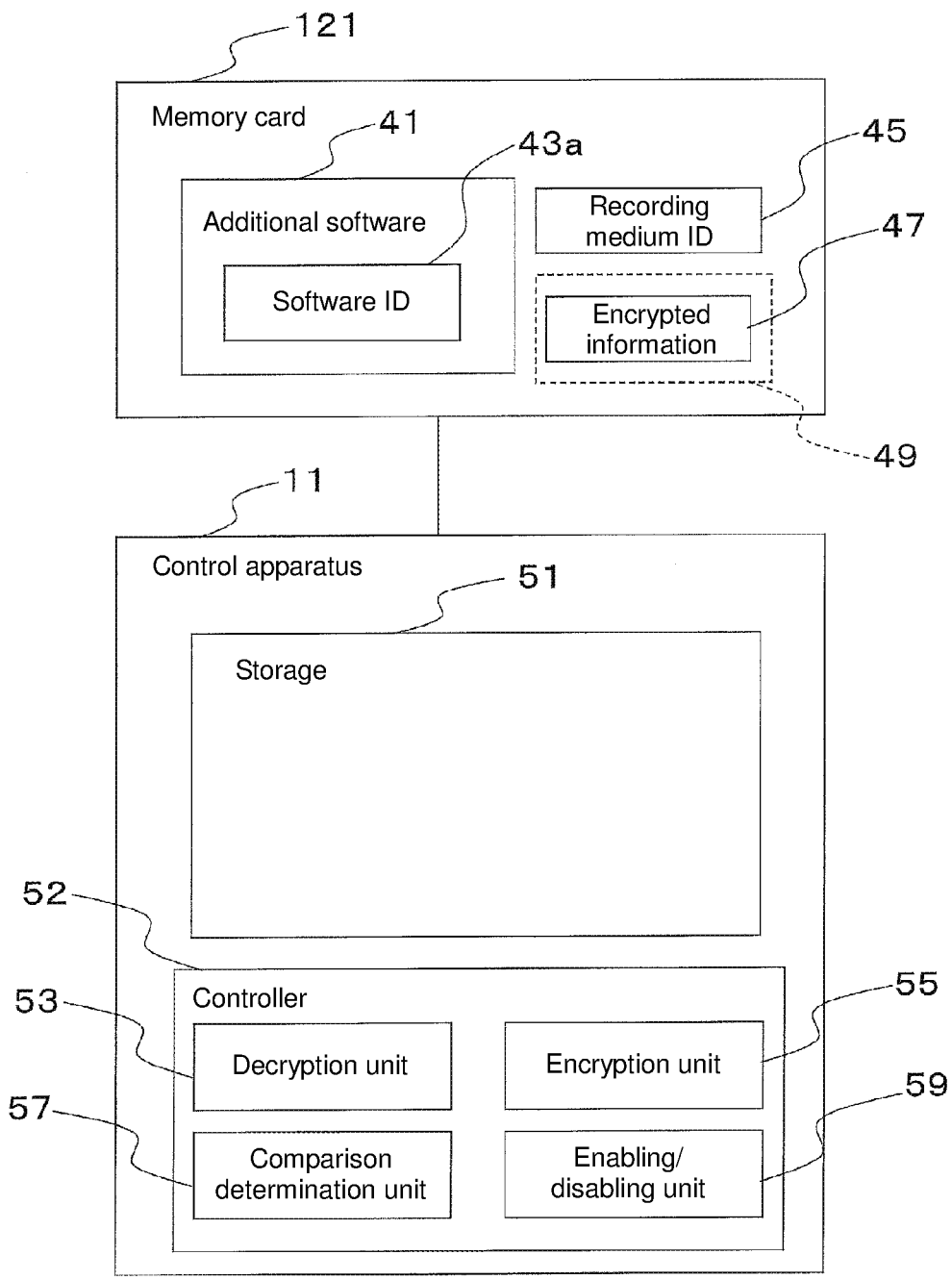
FIG. 3 is a block diagram showing a functional configuration of the control apparatus and a data configuration of a memory card.

With reference to FIG. 3, a description will be given on a control configuration of the control apparatus 11 and a data configuration stored in the memory card 121. FIG. 3 is a diagram for describing the control configuration of the control apparatus and the data configuration of the memory card.

The memory card 121 is a memory card used to install an additional software 41 into the control apparatus 11. The memory card 121 is a medium which software and data can be read from and written in, and the memory card 121 is specifically a recording medium such as an SD memory card and a USB memory. These recording media can be detachable to the control apparatus 11.

As shown in the drawing, the memory card 121 stores the additional software 41. The additional software 41 is installed in the control apparatus 11 and thus becomes a part of the program which is subsequently executed by the CPU 111 of the control apparatus 11. The additional software 41 has a software ID 43*a*. The additional software 41 further includes, other than binary of the software, various types of information such as an installation method and a version. The software ID 43*a* is the software identification information with which normally issued additional software 41 can be identified, and is an ID unique to each license.

Further, the memory card 121 stores the recording medium ID 45. The recording medium ID 45 is recording medium identification information with which the memory card 121 can be identified. The recording medium ID 45 is a unique ID and may be an ID provided according to the standard (for example, the CID register) or an ID uniquely modified by a user.

Further, the memory card 121 stores encrypted information 47. The encrypted information 47 is information used to certify that the additional software 41 is stored in the memory card 121 as authorized software. Thus, if the encrypted information 47 is not included in the memory card 121 or if the encrypted information 47 cannot be read out from the memory card 121, the additional software 41 cannot be installed, as described later. Specifically, the encrypted information 47 is the information generated by encrypting a software ID 43*b* (to be described later), using the recording medium ID 45 as a key.

Note that the memory card 121 does not store the software used for the encryption. Further, the encrypted information 47 is generated by the control apparatus 11 or other devices, as described later.

The encrypted information 47 is stored in a protected area 49 of the memory card 121. The protected area 49 is an area using a file system accessible by an OS of the control apparatus 11. Therefore, a general purpose PC cannot access the encrypted information 47. As a result, even if the additional software 41 and the recording medium ID 45 are copied in another memory card by a general purpose PC, the encrypted information 47 cannot be copied.

As shown in the drawing, the control apparatus 11 has a storage 51 and a controller 52. The storage 51 is configured with the RAM 113 in FIG. 2. The controller 52 is a function of installation software realized by the CPU 111. The controller 52 has, as function blocks, a decryption unit 53, an encryption unit 55, a comparison determination unit 57, and an enabling/disabling unit 59.

The decryption unit 53 has a function, as described later, to decrypt the encrypted information 47 and thus to generate the software ID 43b.

The encryption unit 55 has a function, as described later, to encrypt the software ID 43b and thus to generated the encrypted information 47.

The comparison determination unit 57 has a function, as described later, to compare the software IDs 43a and 43b with each other and thus determines whether the both are identical.

The enabling/disabling unit 59 has a function, as described later, to enable or disable the additional software 41 on the control apparatus 11. To "enable" is, for example, to dispose the additional software 41 at an appropriate position in the memory so that the additional software 41 can be used when the control apparatus 11 is restarted. To "disable" is, for example, to delete the additional software 41 or putting the additional software 41 in a state in which the additional software 41 cannot be executed even if the additional software 41 is not deleted.

(6) Control Operation

Figure 4:
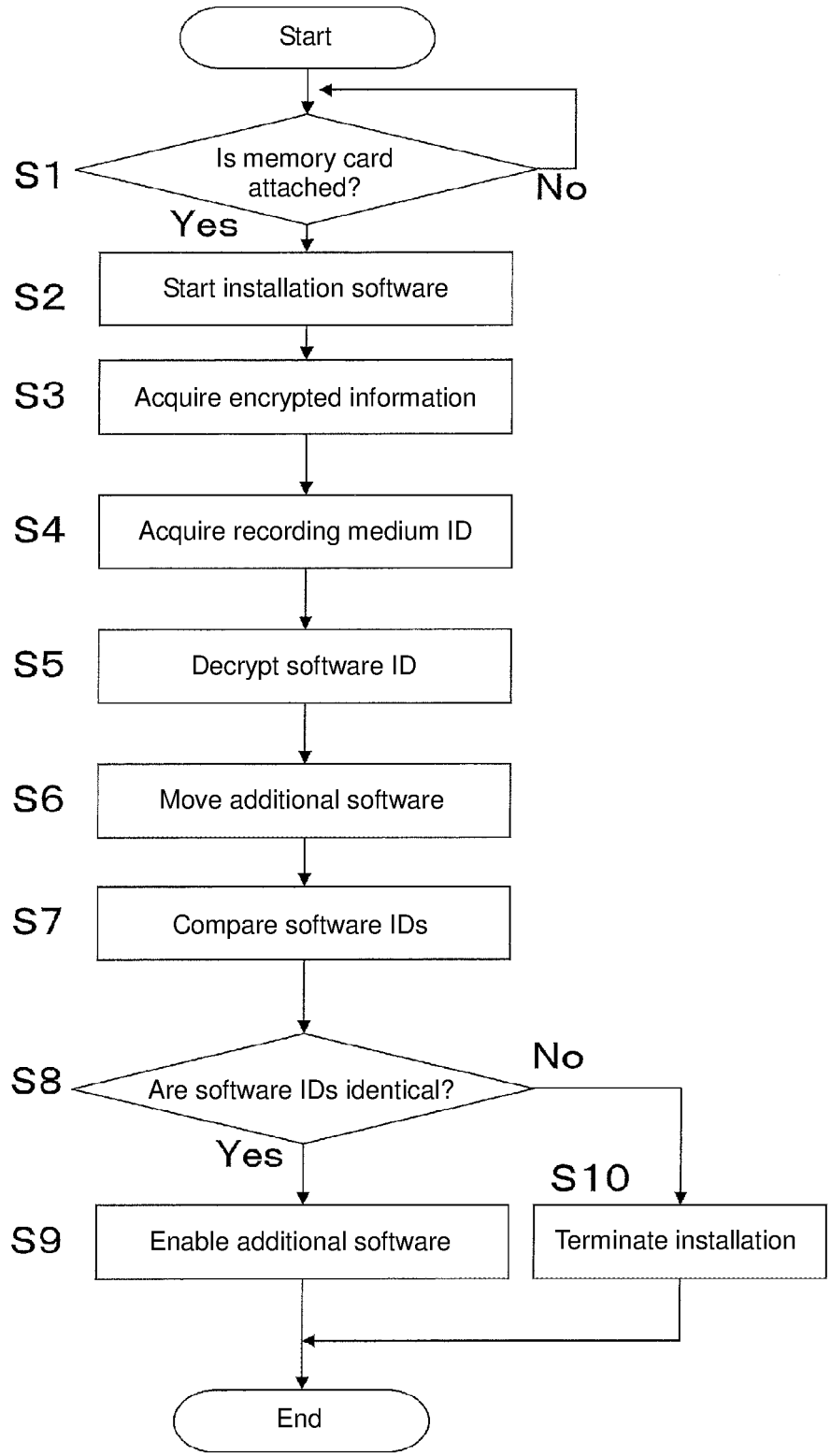
FIG. 4 is a flowchart showing a control operation of installing additional software.

Next, with reference to FIG. 4 and FIGS. 5 to 9, a description will be given on a control operation of installing the additional software 41 by the control apparatus 11. FIG. 4 is a flowchart showing the control operation of installing the additional software. FIGS. 5 to 9 are block diagrams showing functional configurations of the control apparatus and data configurations of the memory card.

Note that the order of the steps in the following control flow is not limited to that in the description. Further, the steps may be simultaneously performed or partially duplicated.

First, the controller 52 waits for the memory card 121 to be attached to the control apparatus 11 (step S1). Note that, as shown in FIG. 3, on the control apparatus 11, the storage 51 in the initial state does not store any one of the recording medium ID 45, the encrypted information 47, and the software IDs 43a and 43b.

When the memory card 121 is attached to the control apparatus 11 (step S1: Yes), installation software is started (step S2).

Figure 5:
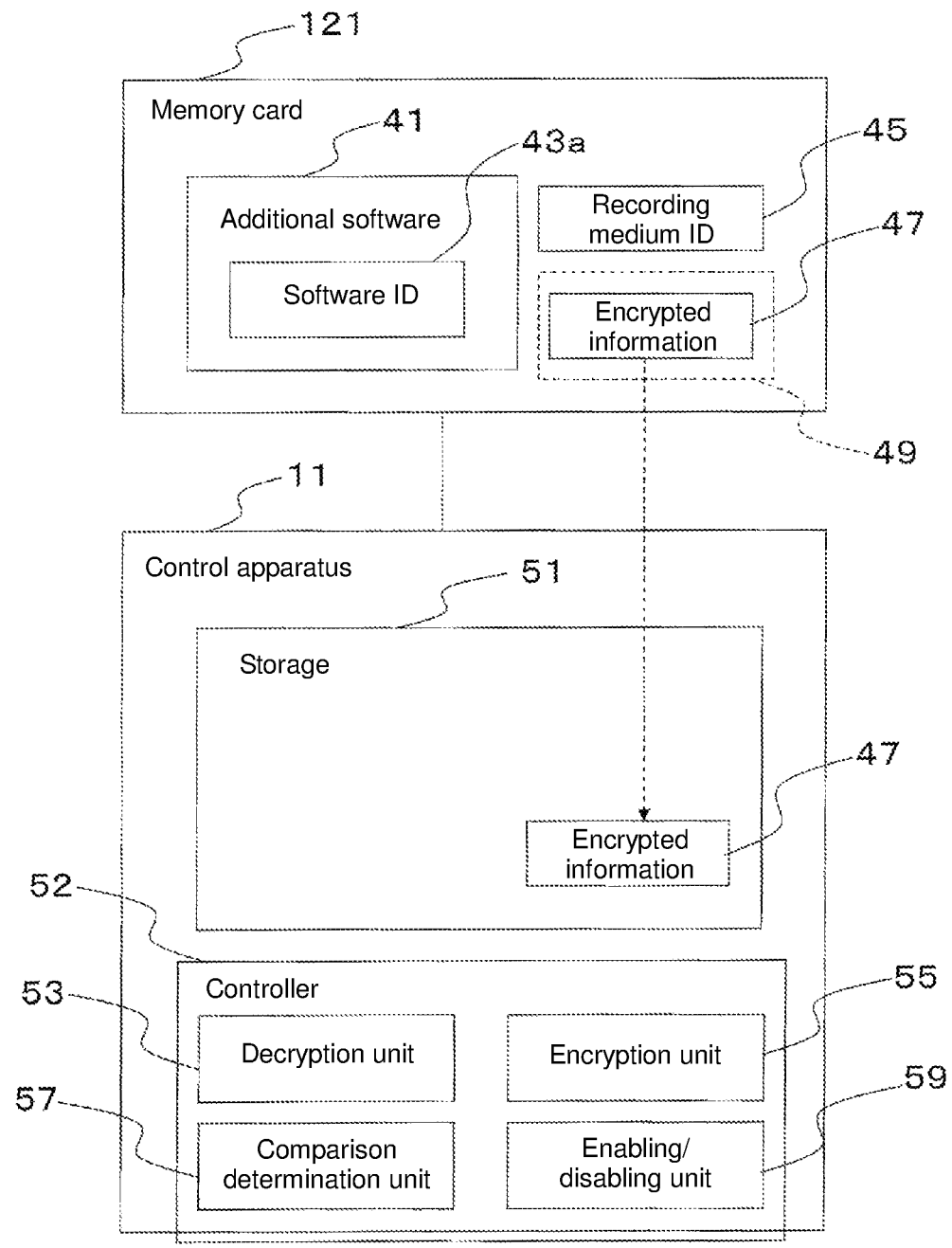
FIG. 5 is a block diagram showing a functional configuration of the control apparatus and a data configuration of the memory card.

Next, the controller 52 acquires the encrypted information 47 from the memory card 121 (step S3). Specifically, the controller 52 reads out the encrypted information 47 from the protected area 49 of the memory card 121, and writes the encrypted information 47 into the storage 51 as shown in FIG. 5. Note that, although not illustrated in FIG. 4, an installation termination process is performed in the case that the encrypted information 47 cannot be read out correctly for a reason, for example, that there is no encrypted information 47.

Figure 6:
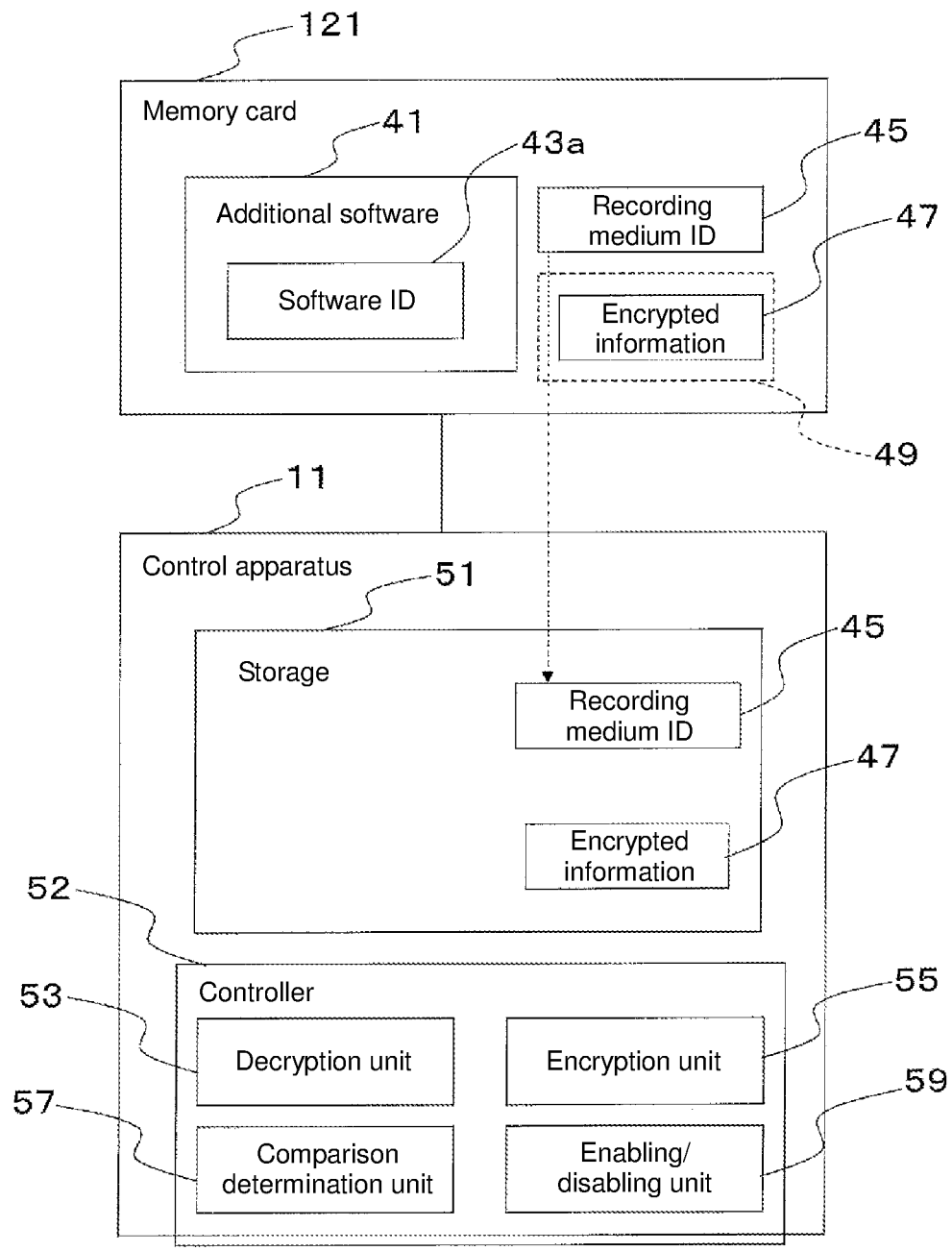
FIG. 6 is a block diagram showing a functional configuration of the control apparatus and a data configuration of the memory card.

Next, the controller 52 acquires the recording medium ID 45 from the memory card 121 (step S4). Specifically, the controller 52 reads out the recording medium ID 45 from the memory card 121, and writes the recording medium ID 45 into the storage 51 as shown in FIG. 6. Note that, although not illustrated in FIG. 4, an installation termination process is performed if the recording medium ID 45 cannot be read out correctly. Further, there is no particular limitation in the order of the operations of acquiring the encrypted information 47 (step S3) and acquiring the recording medium ID 45 (step S4).

Figure 7:
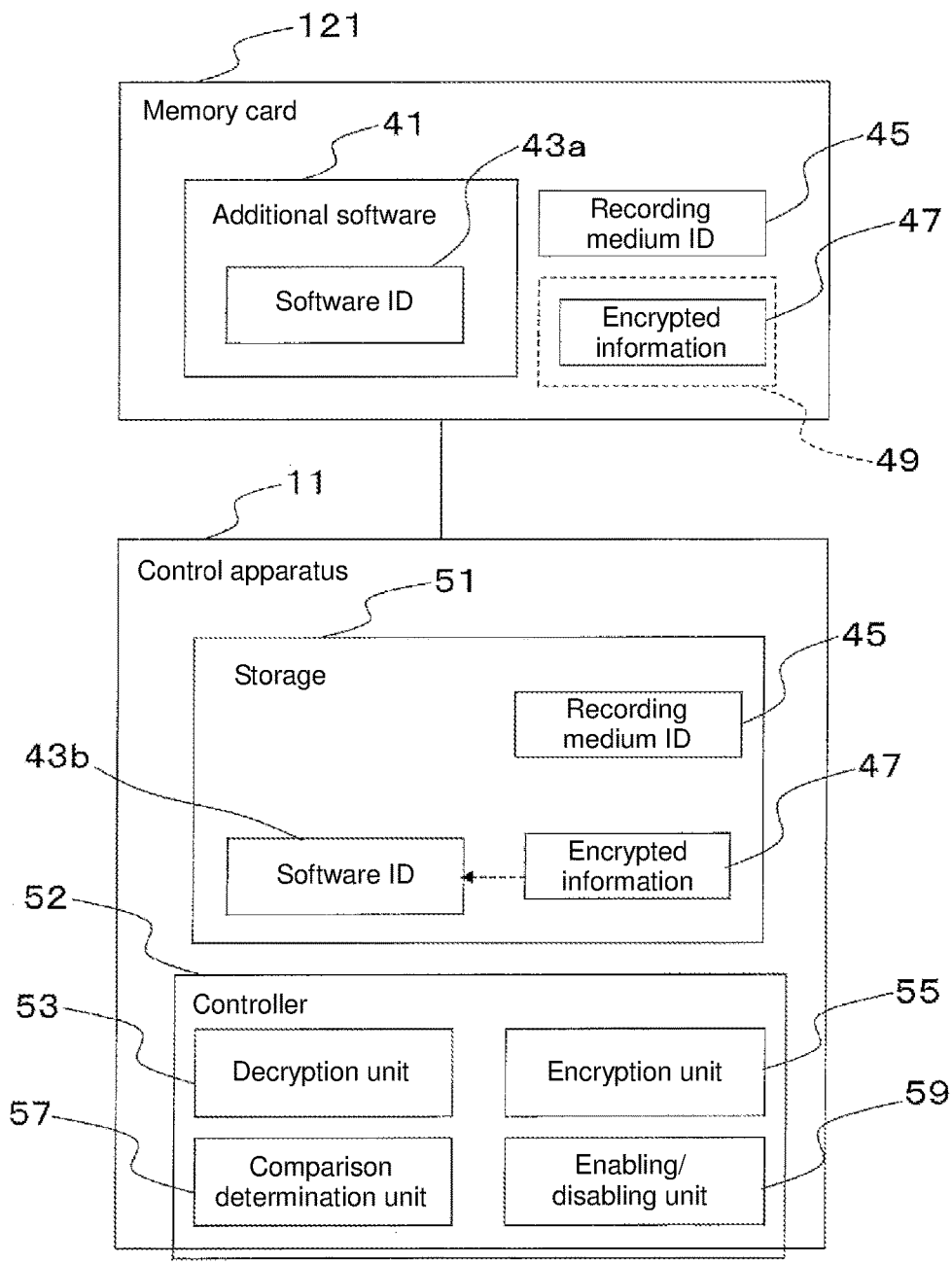
FIG. 7 is a block diagram showing a functional configuration of the control apparatus and a data configuration of the memory card.

Next, the control apparatus 11 (more specifically, the decryption unit 53) decrypts the encrypted information 47 by using the recording medium ID 45 and thus obtains the software ID 43b which has been encrypted (step S5). As a result, as shown in FIG. 7, the software ID 43b is stored in the storage 51. Note that, although not illustrated in FIG. 4, an installation termination process is performed in the case that the encrypted information 47 cannot be decrypted for a reason, for example, that the recording medium ID as the key of the encrypted information 47 is different from the recording medium ID 45 of the memory card 121. Note that in the above case, the additional software is copied in an irregular memory card.

Figure 8:
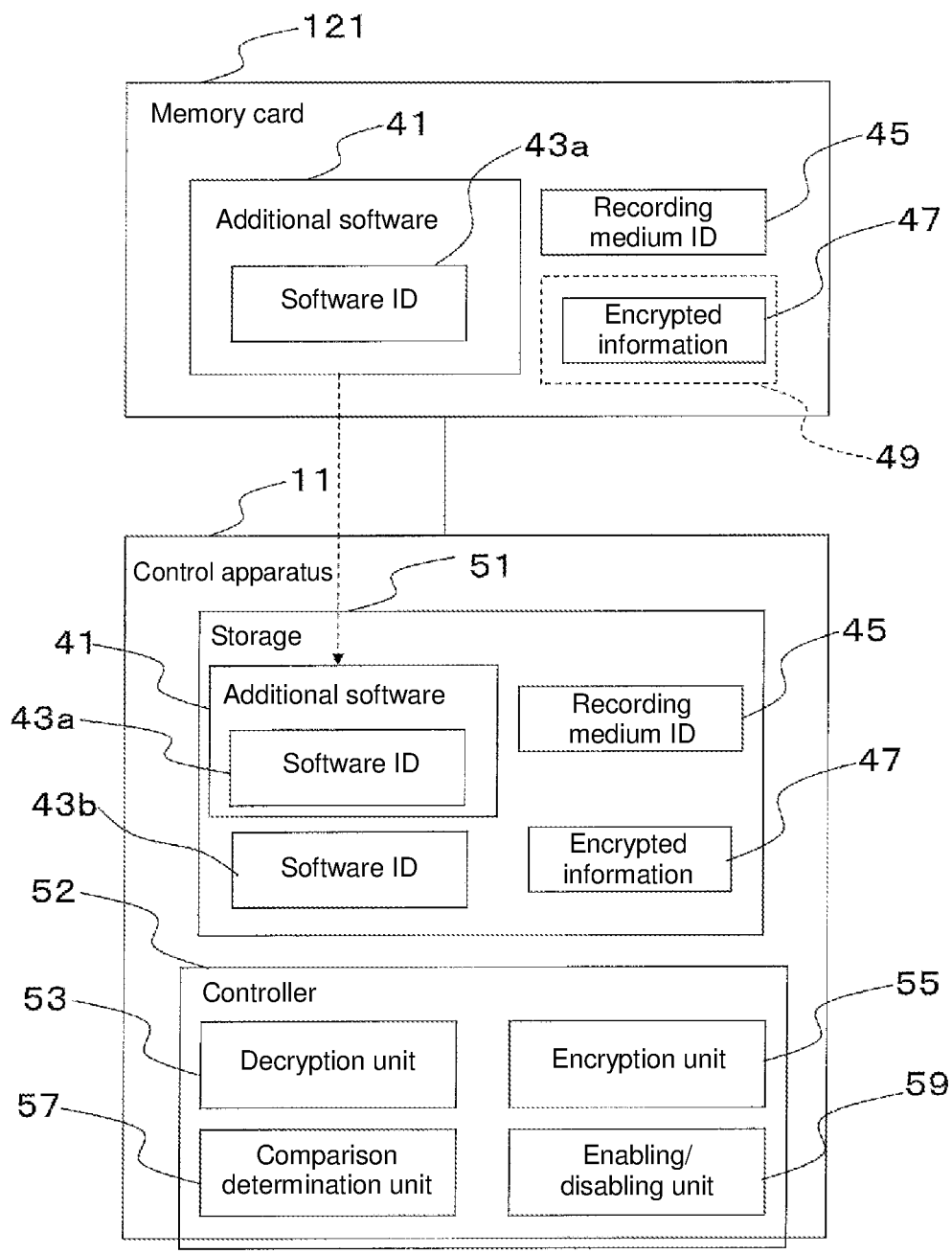
FIG. 8 is a block diagram showing a functional configuration of the control apparatus and a data configuration of the memory card.

Next, the controller 52 temporarily moves the additional software 41 from the memory card 121 to the storage 51 (step S6). Specifically, the controller 52 reads out, as shown in FIG. 8, the additional software 41 from the memory card 121 and writes the additional software 41 into the storage 51, and in addition, the controller 52 deletes the additional software 41 in the memory card 121. Note that, although not illustrated in FIG. 4, an installation termination process is performed in the case that the additional software 41 cannot be moved.

Figure 9:
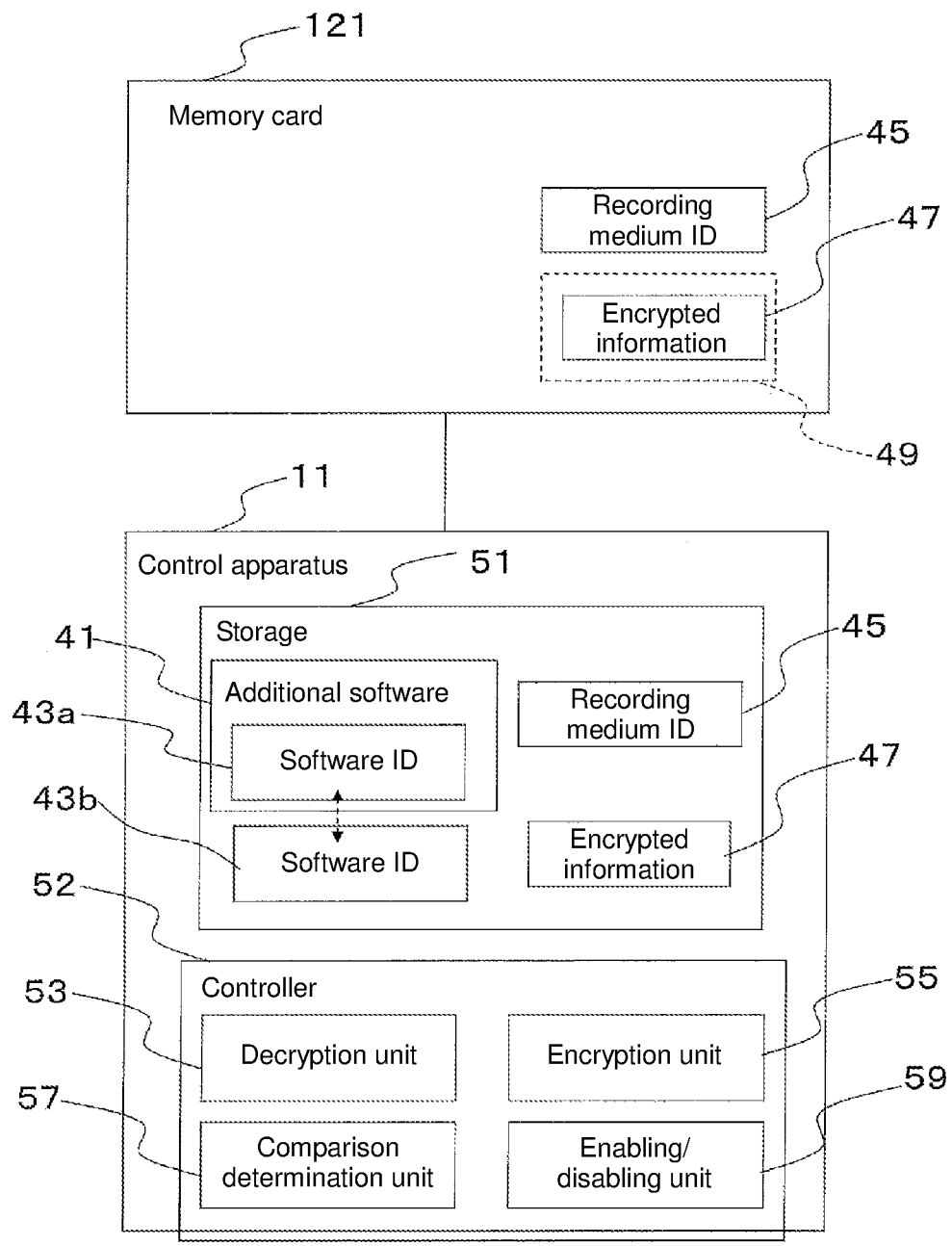
FIG. 9 is a block diagram showing a functional configuration of the control apparatus and a data configuration of the memory card.

Next, the control apparatus 11 (specifically, the comparison determination unit 57) compares the software ID 43a in the additional software 41 and the software ID 43b obtained by decryption (step S7). Specifically, as shown in FIG. 9, the comparison determination unit 57 determines whether the two IDs are identical.

If the two IDs are identical (step S8: Yes), the process moves to step S9; and if the two IDs are not identical (step S8: No) the process moves to step S10.

If the two IDs are identical, the control apparatus 11 (specifically, the enabling/disabling unit 59) enables the additional software 41 (step S9). To "enable" is, for example, to store the additional software 41 at an appropriate position in the storage 51 so that the additional software 41 is executed when the control apparatus 11 is restarted.

If the two IDs are not identical, the additional software 41 is not allowed to be installed for the reason that the installation is unauthorized. Therefore, an installation termination process is performed (step S10). Specifically, as shown in FIG. 3, the storage 51 is returned to the initial state.

Note that, after the additional software 41 is installed, the recording medium ID 45, the encrypted information 47, and the software ID 43b are deleted from the storage 51. Further, after the additional software 41 is normally installed, all the data on the memory card 121 are deleted.

As described above, only in the case that the decrypted software ID 43b agrees with the software ID 43a obtained from the additional software 41 as a result of the comparison between them, the additional software 41 becomes usable. Thus, only in the case that the memory card 121 storing the correct encrypted information 47 is used, the additional software 41 is installed in the control apparatus 11 and is thus usable.

2. Second Embodiment

In the first embodiment, before the encrypted information 47 is decrypted to obtain the software ID 43b (step S5 of FIG. 4), the encrypted information 47 is stored in the storage 51 (step S3 of FIG. 4) and the recording medium ID 45 is stored in the storage 51 (step S4 of FIG. 4). However, at the time of decrypting the encrypted information, there is no limitation to the position at which the encrypted information and the recording medium ID are stored.

Figure 10:
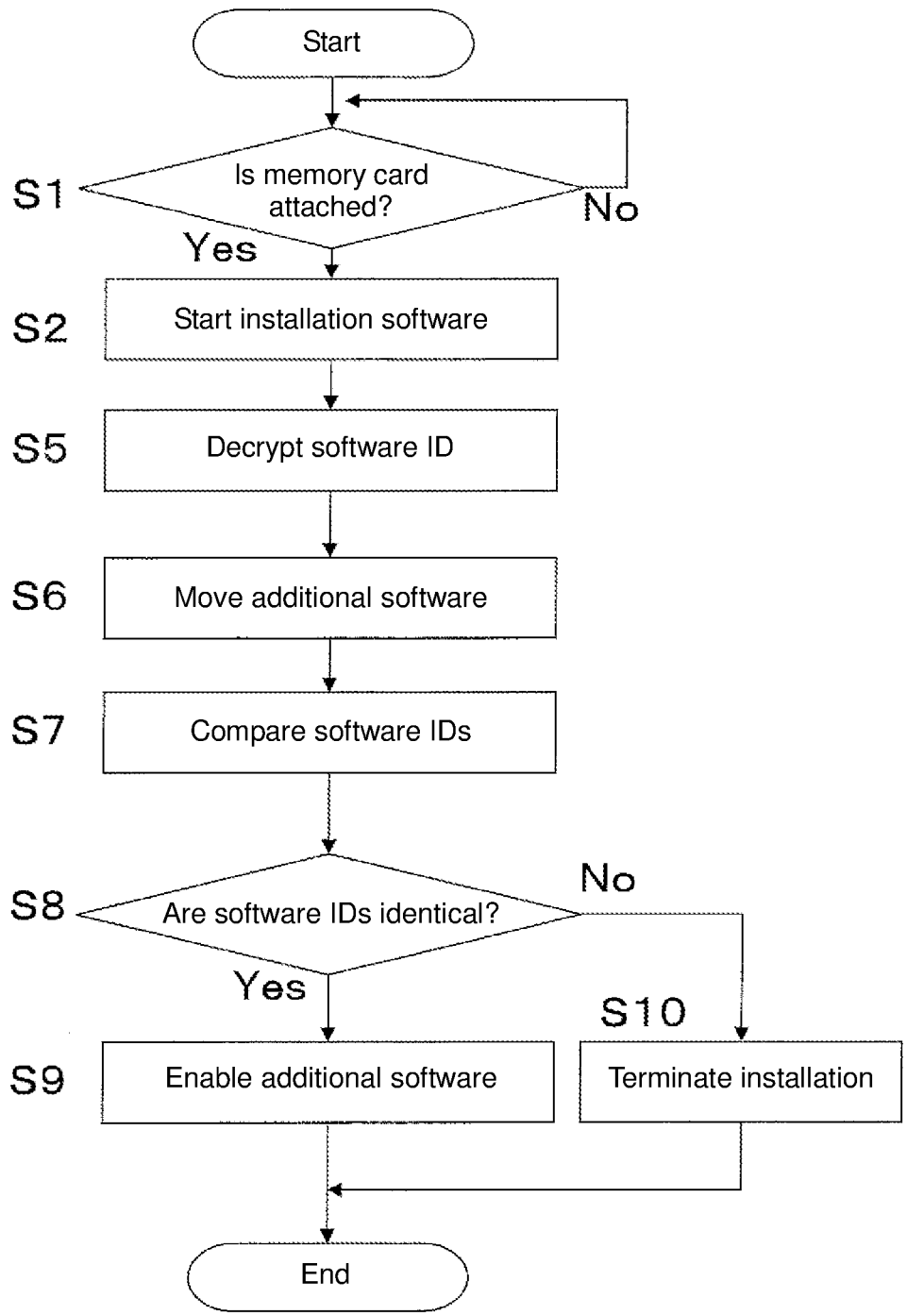
FIG. 10 is a flowchart showing a control operation of installing additional software (a second embodiment).
Figure 11:
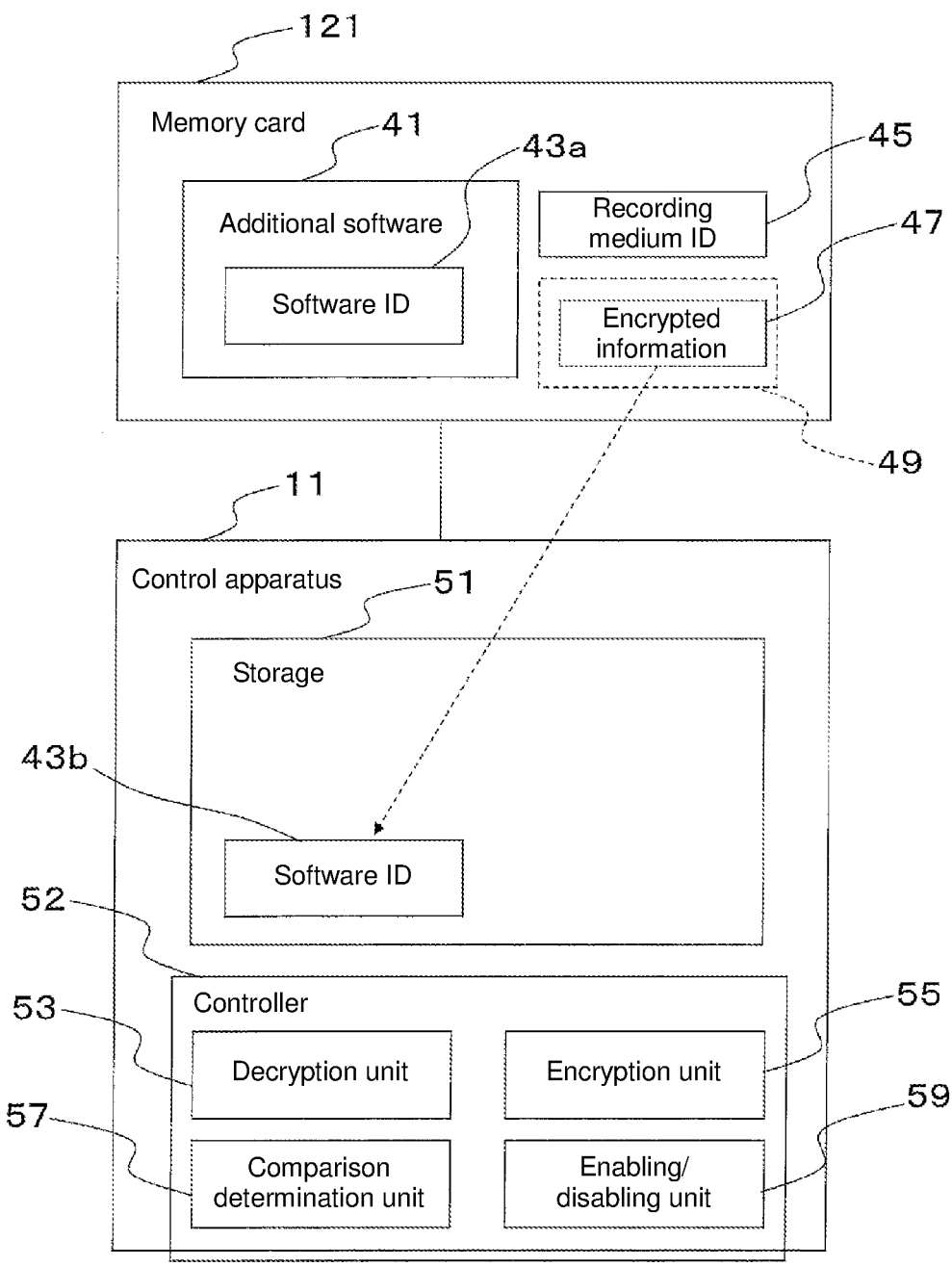
FIG. 11 is a block diagram showing a functional configuration of a control apparatus and a data configuration of a memory card (the second embodiment).

Hereinafter, a second embodiment will be described with reference to FIG. 10 and FIG. 11. FIG. 10 is a flowchart showing the control operation of installing the additional software. FIG. 11 is a block diagram showing the functional configuration of the control apparatus and the data configuration of the memory card. Note that the components and functions common to the above embodiment are not described again.

In FIG. 10, step S3 and step S4 are not included as blocks, as compared with FIG. 4 of the first embodiment. However, at the time of performing the step of decrypting, a controller 52 reads out a recording medium ID 45 of a memory card 121 and encrypted information 47 (step S5 of FIG. 10).

In this case, as shown in FIG. 11, different from FIG. 7 of the first embodiment, the recording medium ID 45 and the encrypted information 47 are not written into a storage 51, but only software ID 43b is written into the storage 51.

3. Third Embodiment

In the first embodiment, before the software IDs 43a and 43b are compared with each other (step S8 of FIG. 4), the additional software 41 is moved to the storage 51 (step S7 of FIG. 4). However, at the time of comparing the software IDs with each other, there is no limitation to the position at which the additional software is stored.

Figure 12:
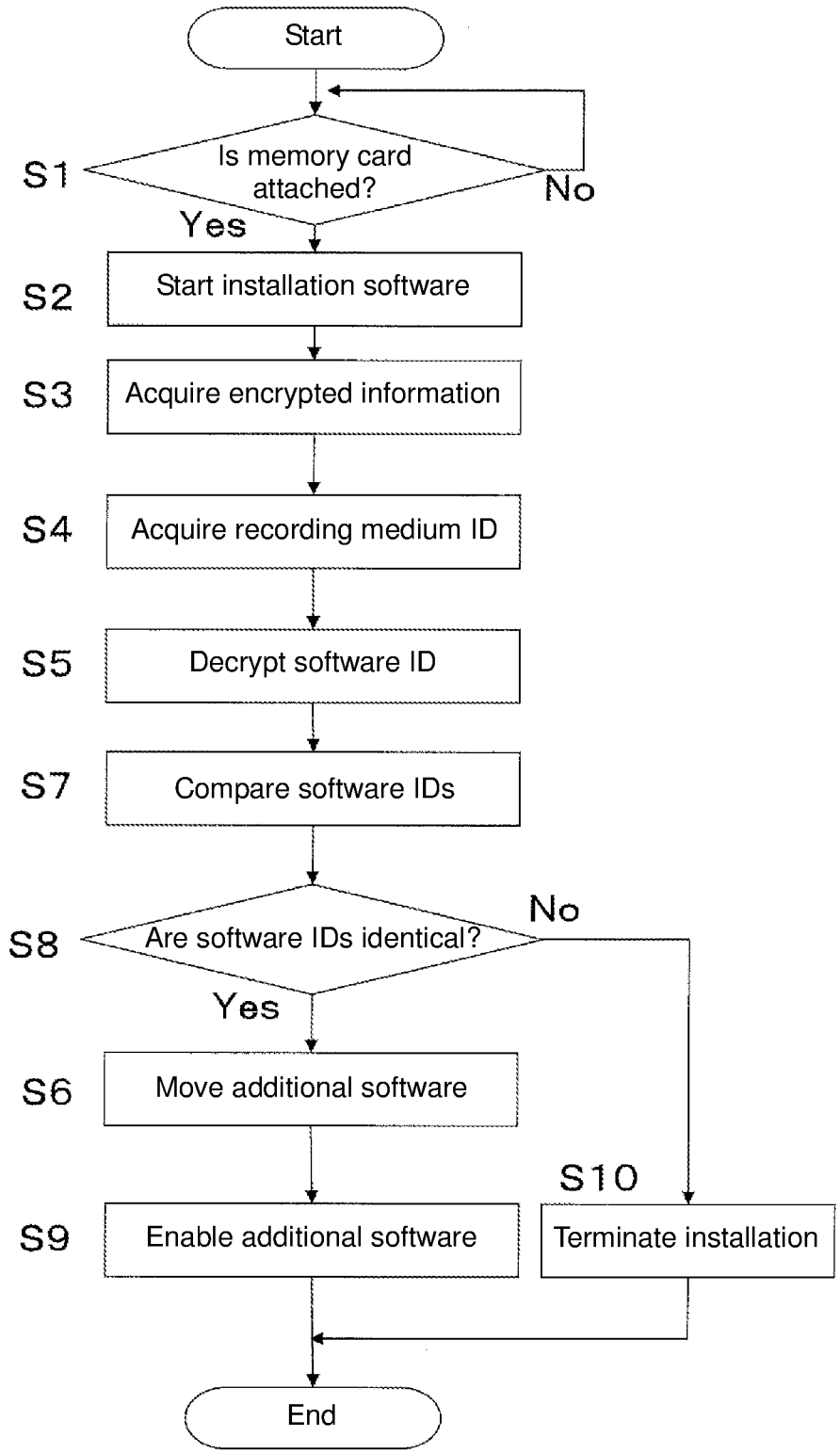
FIG. 12 is a flowchart showing a control operation of installing additional software (a third embodiment).
Figure 13:
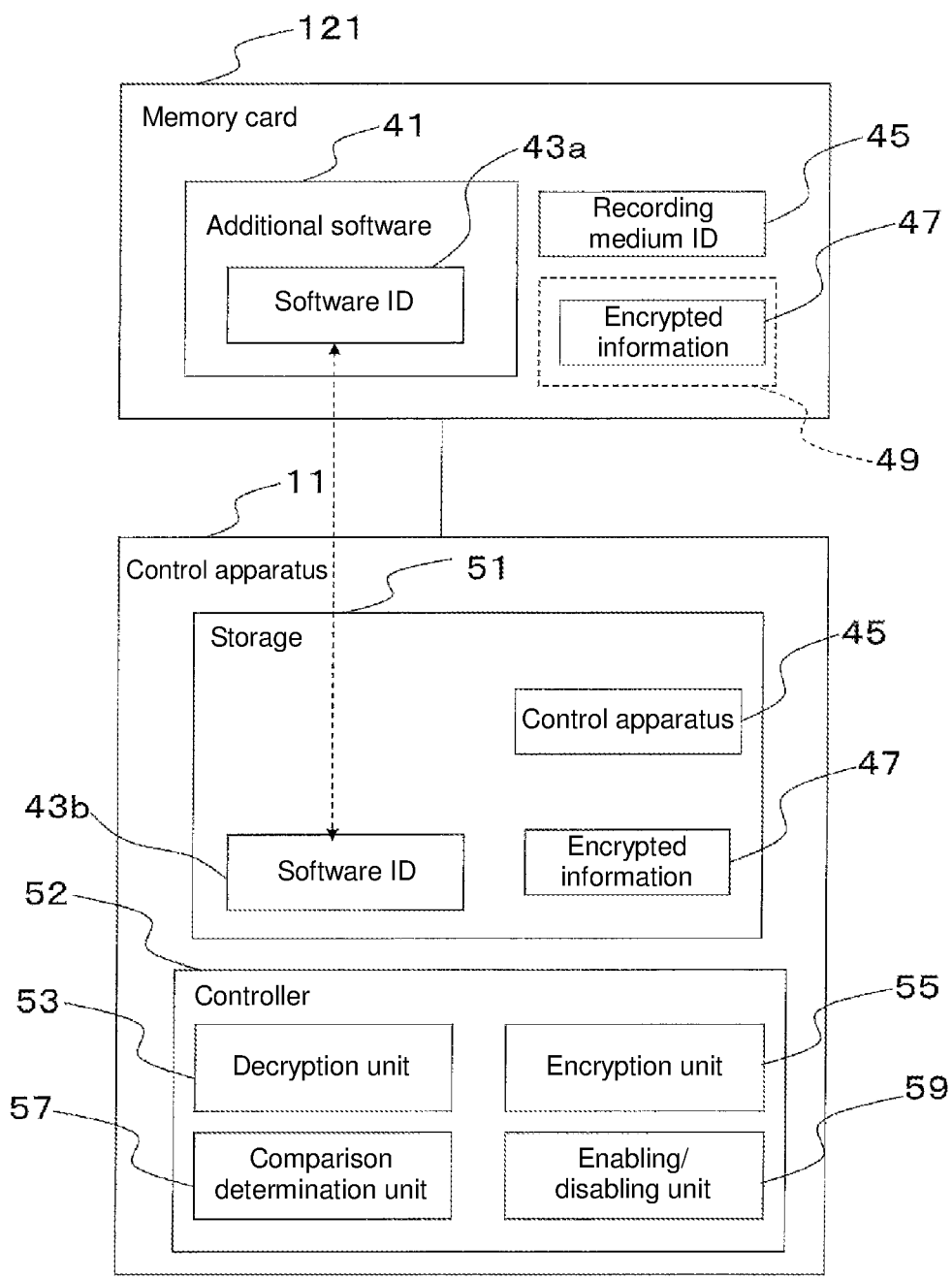
FIG. 13 is a block diagram showing a functional configuration of a control apparatus and a data configuration of a memory card (the third embodiment).

Hereinafter, a third embodiment will be described with reference to FIG. 12 and FIG. 13. FIG. 12 is a flowchart showing the control operation of installing the additional software. FIG. 13 is a block diagram showing the functional configuration of the control apparatus and the data configuration of the memory card. Note that the components and functions common to the above embodiments are not described again.

In FIG. 12, different from the first embodiment, a controller 52 compares software IDs with each other (step S8) before moving additional software 41 (step S6).

In this case, as shown in FIG. 13, different from FIG. 10 of the first embodiment, the controller 52 compares the two pieces of software with each other by reading out the additional software 41 stored in a recording medium 21 (step S7 of FIG. 12). Note that, different from the first embodiment, in the embodiment, the additional software is moved only in the case that the two pieces of software agrees as a result of the comparison between them.

4. Fourth Embodiment

In the first to third embodiments, there is described the control operation which installs the additional software into the control apparatus from the memory card; however, in a fourth embodiment, there is described a control operation which saves an additional software in a memory card by using a control apparatus.

Figure 14:
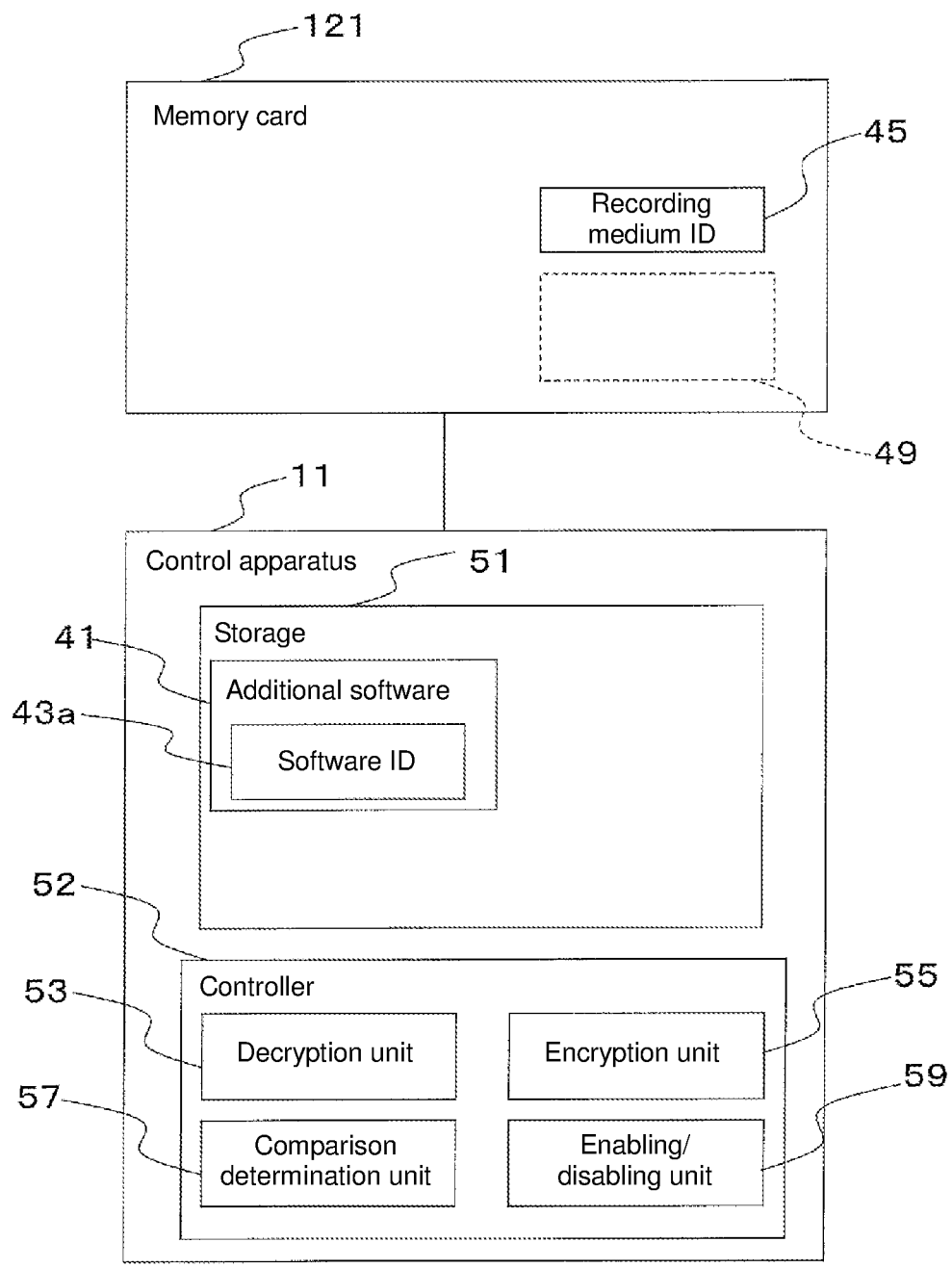
FIG. 14 is a block diagram showing a functional configuration of a control apparatus and a data configuration of the memory card (a fourth embodiment).

First, with reference to FIG. 14, a description will be given on the control configuration of a control apparatus 11 and on a configuration of the data stored in a memory card 121. FIG. 14 is a block diagram showing the functional configuration of the control apparatus and the data configuration of the memory card. Note that the components and functions common to the above embodiments are not described again.

The memory card 121 stores a recording medium ID 45. The recording medium ID 45 is recording medium identification information with which the memory card 121 can be identified. Note that the memory card 121 does not store additional software 41 or encrypted information 47.

In the same manner as in the first embodiment, a controller 52 has a storage 51. The storage 51 is configured with the RAM 113 of FIG. 2. As the functions for saving software that are realized by an CPU 111, the controller 52 has a decryption unit 53, an encryption unit 55, a comparison determination unit 57, and an enabling/disabling unit 59. The functions of these function units are the same as those of the first embodiment.

As shown in the drawing, the storage 51 of the control apparatus 11 stores the additional software 41. The additional software 41 is a part of a program which is executed by the CPU 111 of the control apparatus 11. The additional software 41 has a software ID 43a. The software ID 43a is software identification information with which the normally issued additional software 41 can be identified.

Figure 15:
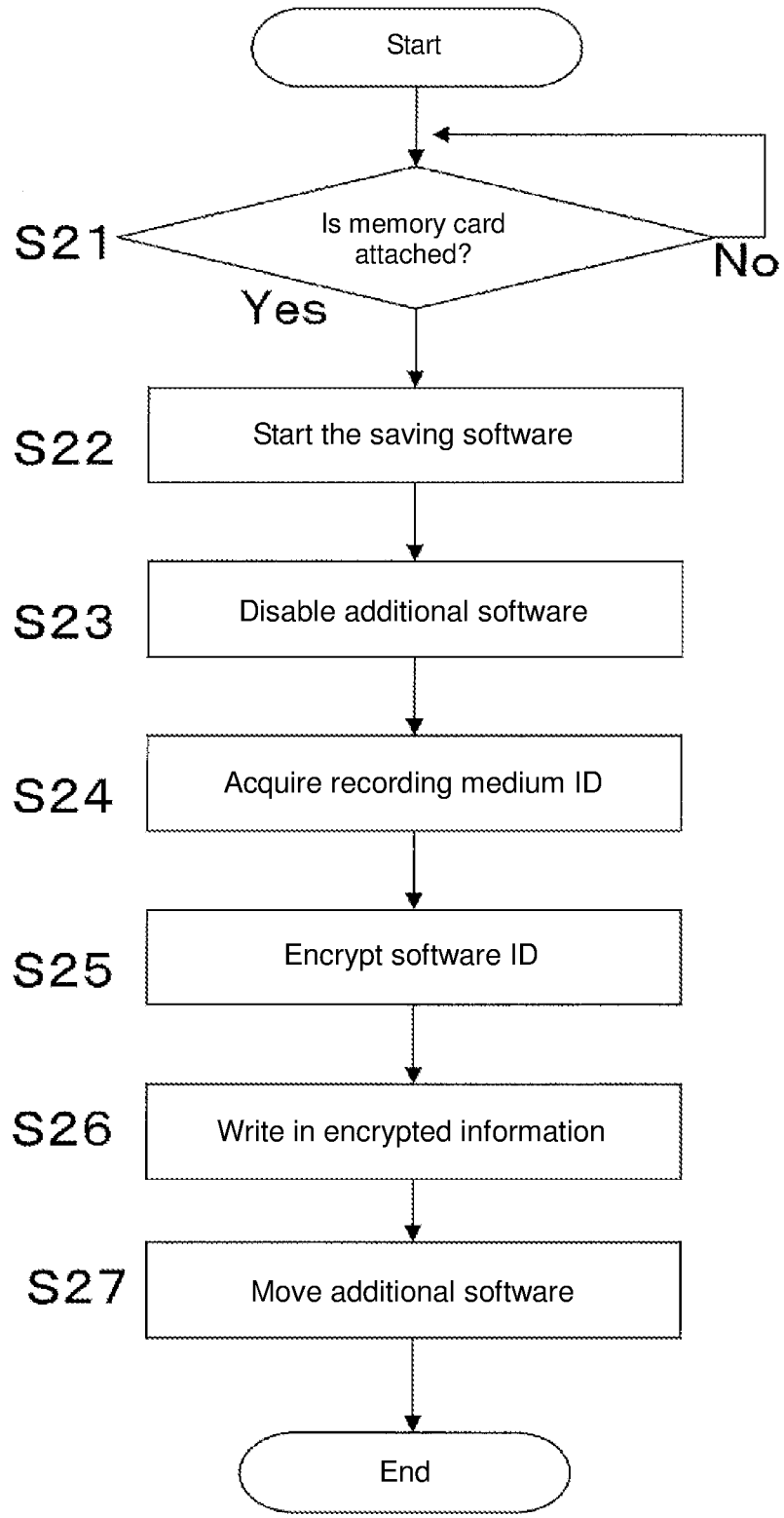
FIG. 15 is a flowchart showing a control operation of installing additional software (the fourth embodiment).

Next, with reference to FIG. 15 and FIGS. 16 to 19, a description will be given on the operation of saving control of the additional software 41 by the control apparatus 11. The "saving control" is control for moving the additional software 41 to the memory card 121. FIG. 15 is a flowchart of the operation of the saving control of the additional software. FIGS. 16 to 19 are block diagrams showing the functional configurations of the control apparatus and the data configurations of the memory card.

Note that there is no limitation to the order of the steps in the following control flow. Further, the steps may be simultaneously performed or partially duplicated.

In response to the operation of a switch (not shown) of the control apparatus 11, the following control operation is started.

First, the controller 52 waits for the memory card 121 to be attached to the control apparatus 11 (step S21). Note that as shown in FIG. 14, on the control apparatus 11, the memory card 121 does not store, in the initial state, the additional software 41 or the encrypted information 47.

If the memory card 121 is attached to the control apparatus 11 (step S21: Yes), the saving software is started (step S22).

Next the control apparatus 11 (specifically, the enabling/disabling unit 59) disables the additional software 41 (step S23). To "disable" is to establish a state in which the data constituting the additional software 41 are left but the control apparatus 11 cannot execute the additional software 41.

Figure 16:
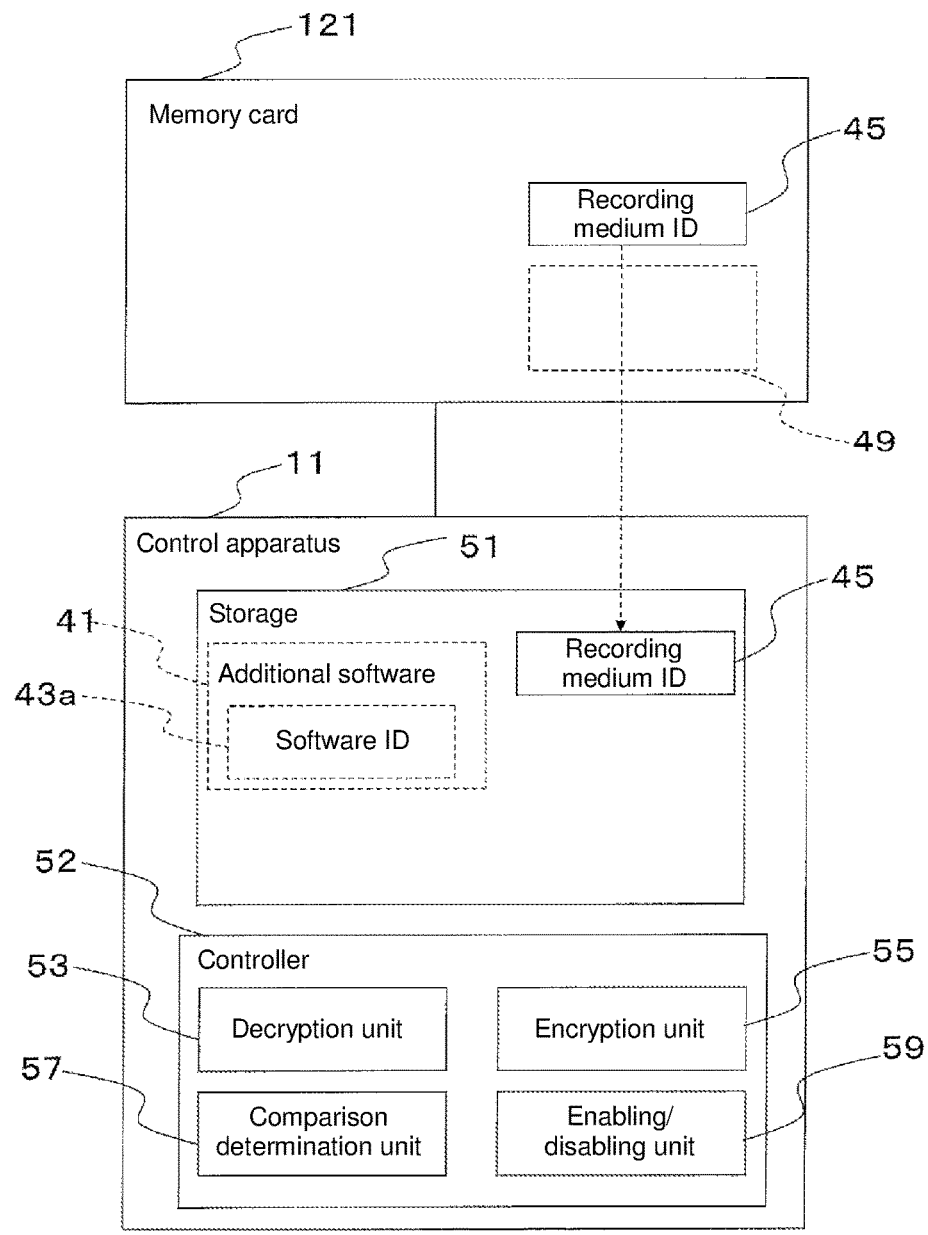
FIG. 16 is a block diagram showing a functional configuration of the control apparatus and a data configuration of the memory card (the fourth embodiment).

Next, the controller 52 acquires the recording medium ID 45 from the memory card 121 (step S24). Specifically, the controller 52 reads out the recording medium ID 45 from the memory card 121 and writes the recording medium ID 45 into the storage 51 as shown in FIG. 16. Note that, although not illustrated in FIG. 15, a termination process of the saving process is performed if the recording medium ID 45 cannot be read out correctly.

Figure 17:
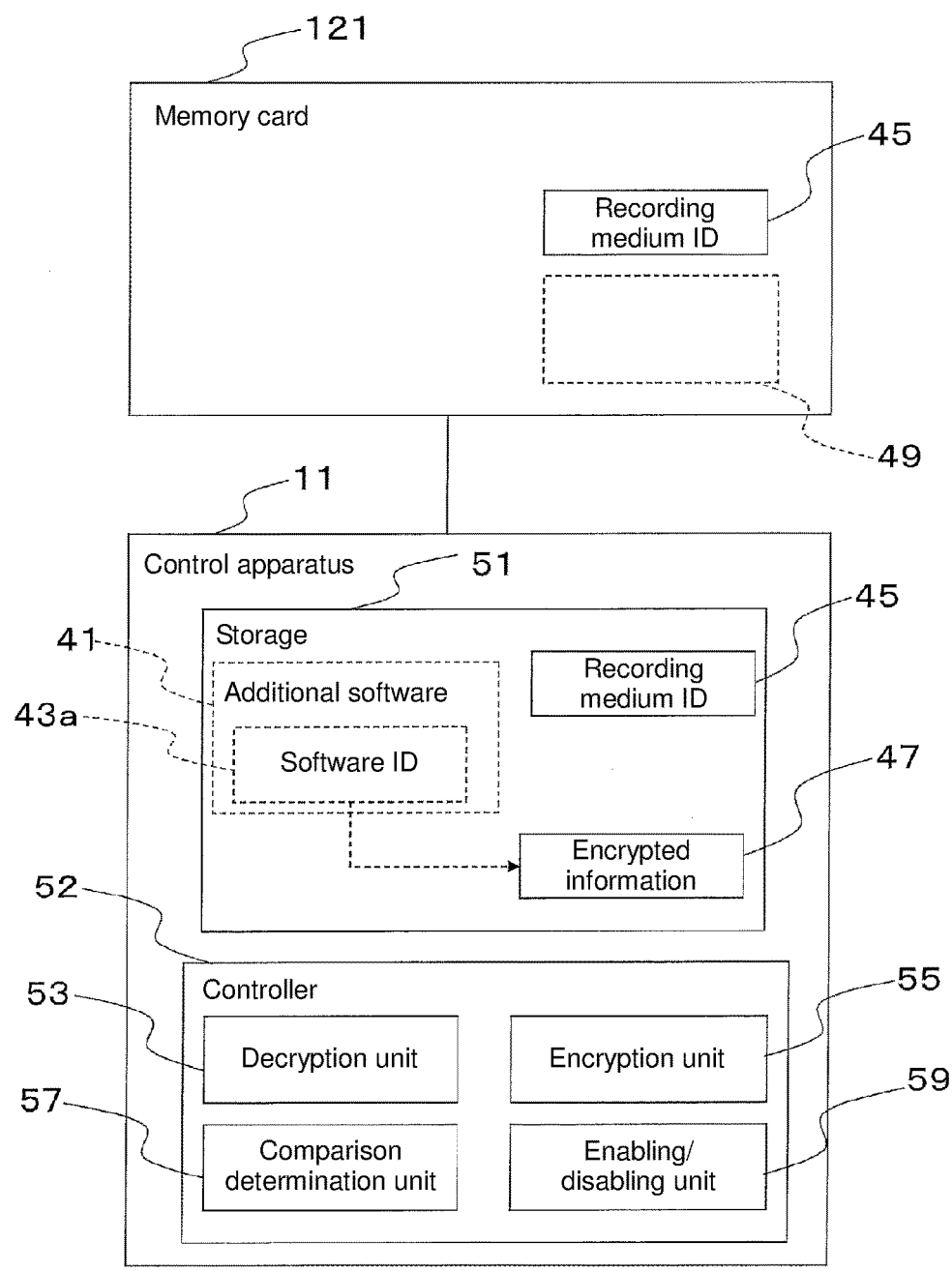
FIG. 17 is a block diagram showing a functional configuration of the control apparatus and a data configuration of the memory card (the fourth embodiment).

Next, the control apparatus 11 (specifically, the encryption unit 55) encrypts the software ID 43a of the additional software 41 by using the recording medium ID 45 and thus obtains the encrypted information 47 (step S25). As a result, as shown in FIG. 17, the encrypted information 47 is stored in the storage 51. Note that, although not illustrated in FIG. 15, the process of terminating the saving is performed if the encryption fails.

Figure 18:
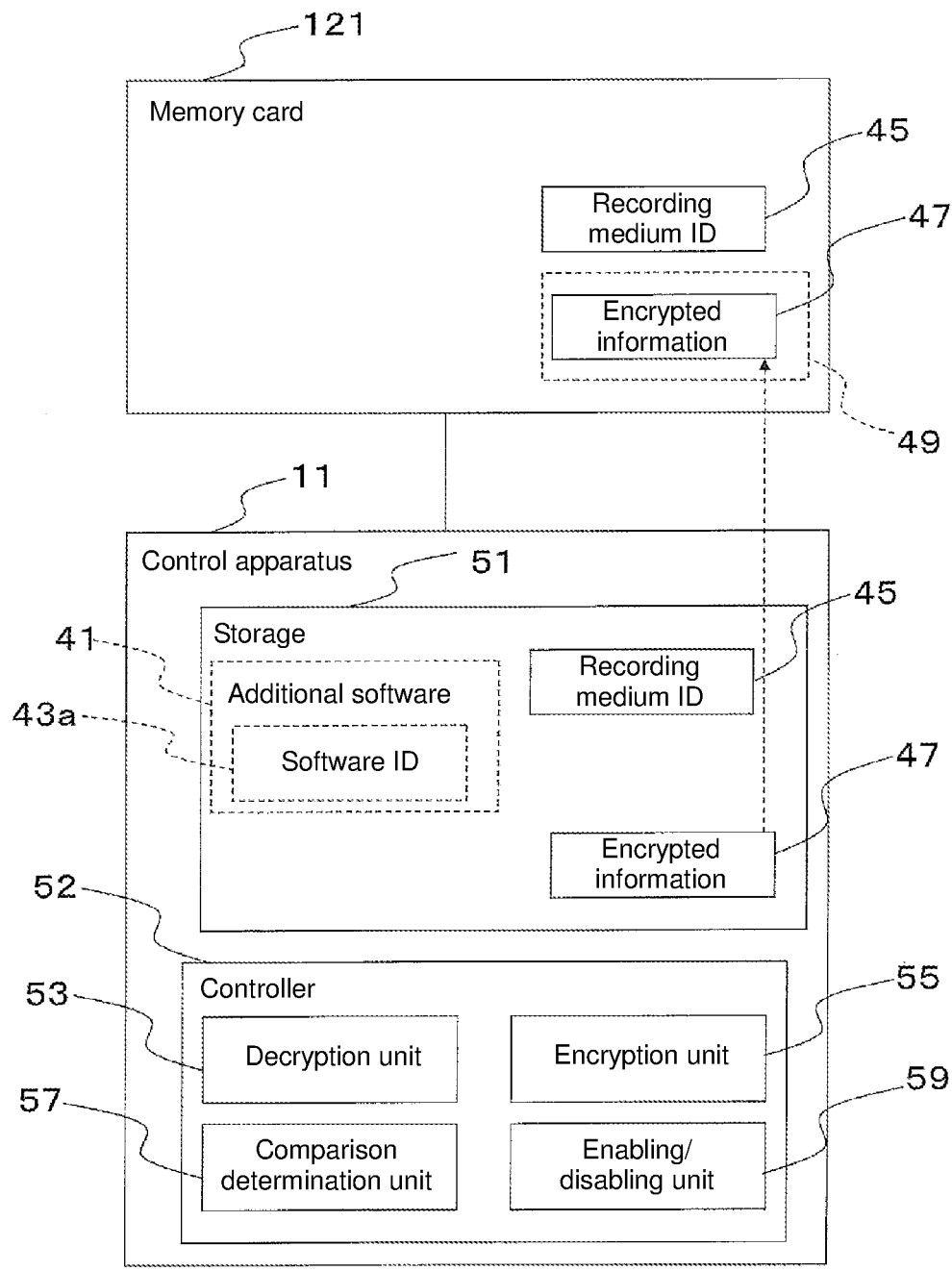
FIG. 18 is a block diagram showing a functional configuration of the control apparatus and a data configuration of the memory card (the fourth embodiment).

Next, as shown in FIG. 18, the controller 52 writes the encrypted information 47 into the protected area 49 of the memory card 121 (step S26).

Figure 19:
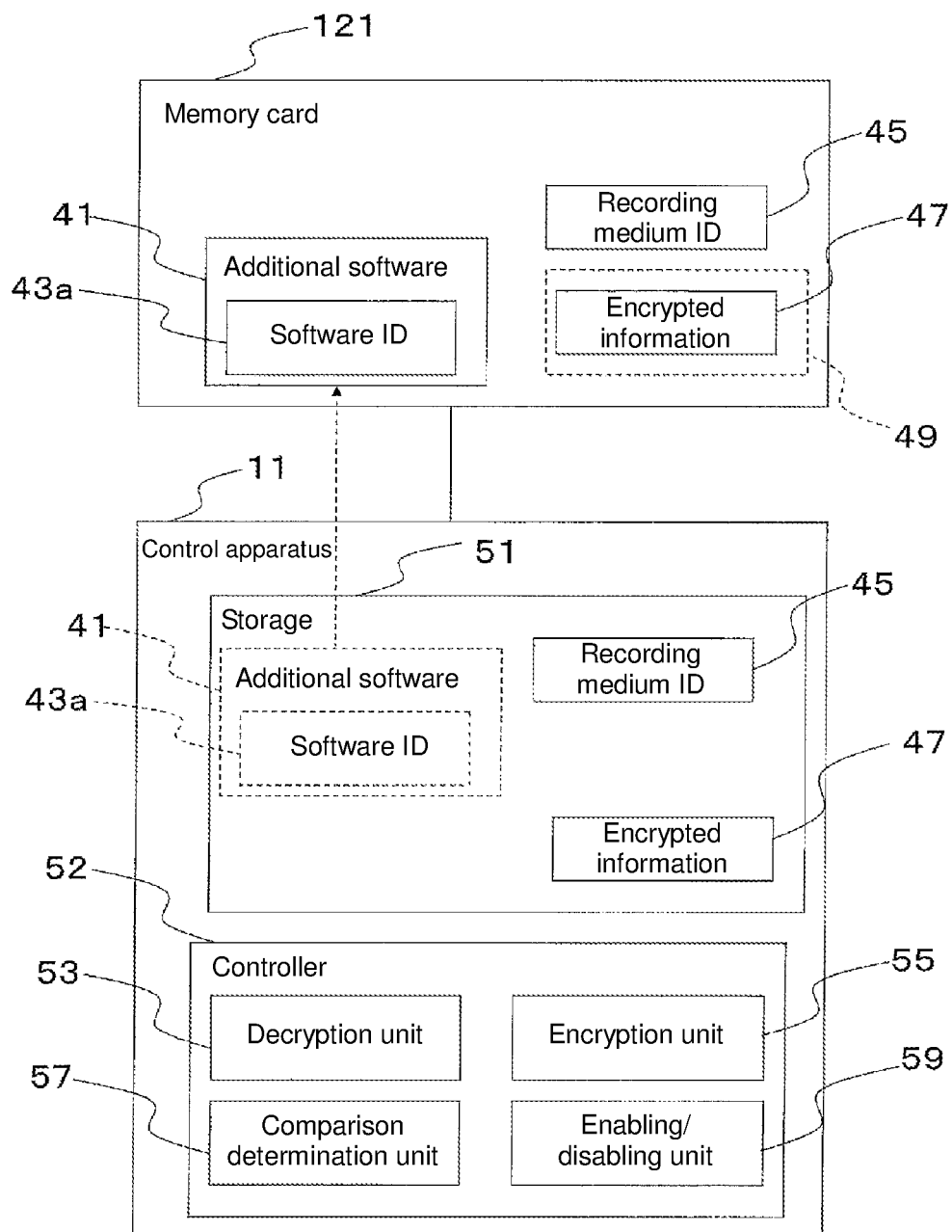
FIG. 19 is a block diagram showing a functional configuration of the control apparatus and a data configuration of the memory card (the fourth embodiment).

Next, as shown in FIG. 19, the controller 52 moves the additional software 41 from the storage 51 to the memory card 121 (step S27). Specifically, the controller 52 reads out the additional software 41 from the storage 51 and writes the additional software 41 into the memory card 121, and in addition, the controller 52 deletes the additional software 41 in the storage 51. Note that, although not illustrated in FIG. 15, the process of terminating the saving is performed if the additional software 41 cannot be moved.

After the additional software 41 is saved, the recording medium ID 45 and the encrypted information 47 are deleted from the storage 51.

In the embodiment, it is possible to write the additional software 41 and the encrypted information 47 in the memory card 121 from the control apparatus 11. Thus, also in the case that the control apparatus 11 need to be repaired due to a failure of a part of the function of the control apparatus 11, it is possible to save the additional software 41 and the encrypted information 47 from the control apparatus 11. As a result, when the failure of the control apparatus 11 has got fixed after the saving, the additional software 41 can be installed again in the control apparatus 11 by using the memory card 121 as in the first to third embodiments. Further, the additional software can be installed in the control apparatus 11 by using the memory card 121.

The modified examples (a) to (c) of the embodiment will be described.

(a) Disabling of the additional software (step S23) may be omitted.

(b) Acquiring of the recording medium ID (step S24) may be omitted. In this cases, the controller 52 reads out the recording medium ID 45 stored in the memory card 121 at the time of encrypting the software ID (step S25).

(c) The timing of moving the additional software (step S27) is not limited to the timing in the above embodiments. For example, moving of the additional software (step S27) may be performed before the encrypted information is written in (step S26).

Further, the embodiment shows that the control apparatus 11 functions as a device which installs the additional software 41 and the encrypted information 47 into the memory card 121. For example, in the case that the storage 51 of the control apparatus 11 stores a plurality pieces of additional software 41 (however, each having different software IDs), the additional software 41 and the encrypted information 47 are installed in each of a plurality of memory cards 121 (however, each having a different recording medium ID) while plurality of memory cards 121 are serially connected to the control apparatus 11 one after another.

5. Fifth Embodiment

In the first to third embodiments, a single memory card stores a piece of additional software; however, the present invention is not limited to the above embodiments. For example, a single memory card may store a plurality pieces of additional software.

Figure 20:
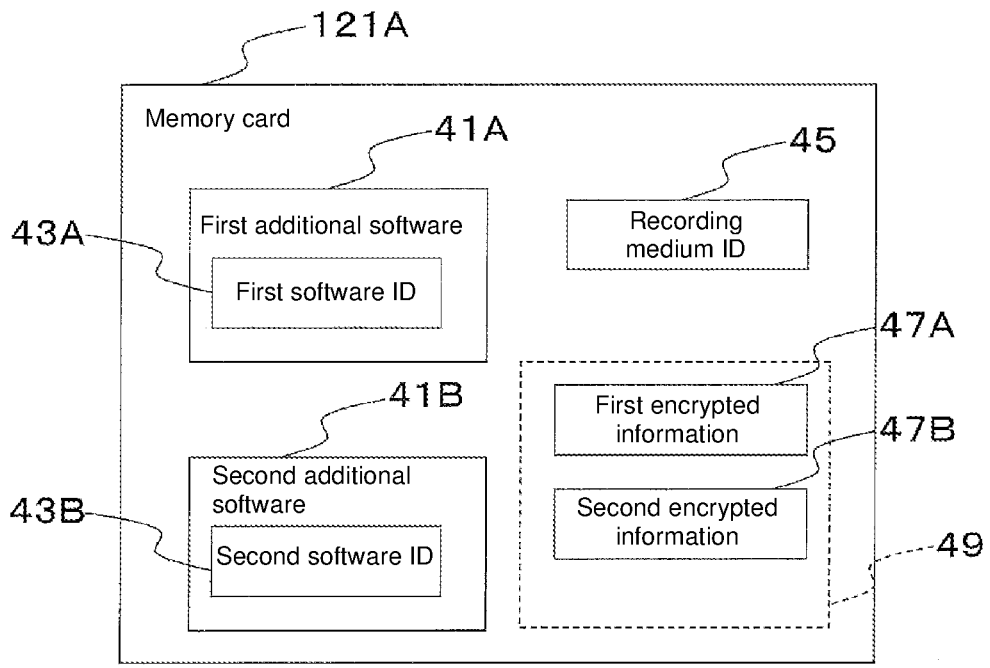
FIG. 20 is a block diagram showing a data configuration of a recording medium (a fifth embodiment).

With reference to FIG. 20, a fifth embodiment will be described. FIG. 20 is a block diagram showing the data configuration of the recording medium. Note that the components and functions common to the above embodiments are not described again.

A memory card 121A is a memory card used to install first additional software 41A and second additional software 41B into one or two control apparatuses 11.

As shown in the drawing, the memory card 121A stores the first additional software 41A and the second additional software 41B. The first additional software 41A and the second additional software 41B are installed in the control apparatus and thus become a part of the program which is subsequently executed by a CPU of the control apparatus. The first additional software 41A has a first software ID 43A. The second additional software 41B has a second software ID 43B. The first software ID 43A is software identification information with which the normally issued first additional software 41A can be identified. The second software ID 43B is software identification information with which the normally issued second additional software 41B can be identified.

Further, the memory card 121A stores a recording medium ID 45. The recording medium ID 45 is recording medium identification information with which the memory card 121A can be identified.

Further, the memory card 121A stores first encrypted information 47A and second encrypted information 47B.

The first encrypted information 47A is information used to certify that the first additional software 41A is stored in the memory card 121A as authorized software. Therefore, if the first encrypted information 47A is not contained or if the first encrypted information 47A cannot be read out, the first additional software 41A cannot be installed. Specifically, the first encrypted information 47A is the information generated by encrypting the first software ID 43A, using the recording medium ID 45 as a key.

The second encrypted information 47B is information used to certify that the second additional software 41B is stored in the memory card 121A as authorized software. Therefore, if the second encrypted information 47B is not included or if the second encrypted information 47B cannot be read out, the second additional software 41B cannot be installed. Specifically, the second encrypted information 47B is the information generated by encrypting the second software ID 43B, using the recording medium ID 45 as a key.

In the embodiment, when the memory card 121A has got connected to the control apparatus, the first additional software 41C is installed. In this case, as described in the first embodiment, after comparing the first software ID (not shown) obtained by decrypting the first encrypted information 47A and the first software ID 43A in the first additional software 41A, the first additional software 41C is installed in the control apparatus. At the time of this first installation, the first additional software 41A is deleted from the memory card 121B, and the first encrypted information 47A is deleted from the memory card 121B.

Next, the second additional software 41D is installed. In this case, as described in the first embodiment, after comparing the second software ID (not shown) obtained by decrypting the second encrypted information 47B and the second software ID 43B in the second additional software 41B, the additional software 41B is installed in the control apparatus. At the time of this second installation, the second additional software 41B and the second encrypted information 47B are deleted from the memory card 121B.

In the above embodiment, a single control apparatus performs the installation of the first additional software 41C and the installation of the second additional software 41D; however, different control apparatuses may perform each of the installations.

As described above, a plurality pieces of additional software can be installed from a single recording medium into a single or more control apparatuses.

Note that the number of pieces of additional software stored in a memory card is not limited to two and may be three or more.

6. Sixth Embodiment

In the fifth embodiment, a single memory card stores plural pieces of additional software, but the present invention is not limited to that embodiment. For example, the configuration may be made such that a memory card stores only one piece of additional software and that the one piece of additional software is installed in a plurality of the control apparatuses. That is, in this case, a plurality of licenses is given to a single piece of additional software.

Figure 21:
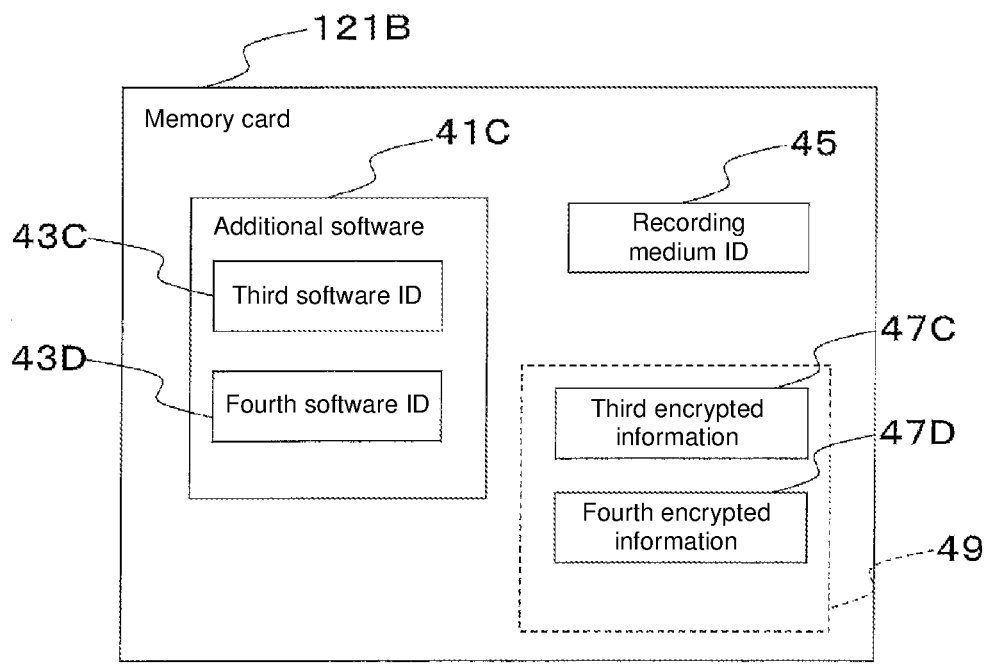
FIG. 21 is a block diagram showing a data configuration of a recording medium (a sixth embodiment).

With reference to FIG. 21, a sixth embodiment will be described. FIG. 21 is a block diagram showing a data configuration of the recording medium. Note that the components and functions common to the above embodiments are not described again.

A memory card 121B is a memory card used to install additional software 41C in a control apparatus.

As shown in the drawing, the memory card 121B stores the additional software 41C. The additional software 41C is installed in the control apparatus and thus becomes a part of the program which is subsequently executed by a CPU of the control apparatus. The additional software 41C has a third software ID 43C and a fourth software ID 43D. The third software ID 43C and the fourth software ID 43D are software identification information with which normally issued additional software 41C can be identified. However, the third software ID 43C and the fourth software ID 43D are different from each other.

Further, the memory card 121B stores a recording medium ID 45. The recording medium ID 45 is recording medium identification information with which the memory card 121B is identified.

Further, the memory card 121B stores third encrypted information 47C and fourth encrypted information 47D.

The third encrypted information 47C and fourth encrypted information 47D are information used to certify that the additional software 41C is stored in the memory card 121B as authorized software. That is, if the third encrypted information 47C or the fourth encrypted information 47D is not contained or if the third encrypted information 47C or the fourth encrypted information 47D cannot be read out, the additional software 41C cannot be installed. Specifically, the third encrypted information 47C is the information generated by encrypting the third software ID 43C, using the recording medium ID 45 as a key. The fourth encrypted information 47D is the information generated by encrypting the fourth software ID 43D, using the recording medium ID 45 as a key.

In the embodiment, when the memory card 121B has got connected to the first control apparatus, the third software ID (not shown) obtained by decrypting the third encrypted information 47C is compared with the third software ID 43C in the additional software 41C, and the additional software 41C is then installed in the control apparatus, as described in the first embodiment. At the time of this first installation, the additional software 41C is not deleted from the memory card 121B. Note that the third encrypted information 47C is deleted from the memory card 121B.

Next, when the memory card 121B has got connected to the second control apparatus, the fourth software ID (not shown) obtained by encrypting the fourth encrypted information 47D is compared with the fourth software ID 43D in the additional software 41C, and the additional software 41C is installed in the control apparatus, as described in the first embodiment. At the time of this second installation, the additional software 41C and the fourth encrypted information 47D are deleted from the memory card 121B.

In the embodiment, based on each of the combinations of the software identification information and the encrypted information, a single piece of additional software can be installed in a plurality of control apparatuses.

Note that the number of the software IDs corresponding to the single piece of additional software is not limited to two but may be three or more.

7. Items Common to Embodiments

Items common to the first to third embodiments and the fifth to sixth embodiments are put together below.

A control apparatus (for example, the control apparatus 11) is used with a recording medium (for example, the memory cards 121, 121A, and 121B) connected to the control apparatus. The recording medium stores: additional software (for example, the additional software 41, the first additional software 41A, the second additional software 41B, and the additional software 41C) including software identification information (for example, the software ID 43a, the first software ID 43A, the second software ID 43B, and the third software ID 43C); recording medium identification information (for example, the recording medium ID 45); and encrypted information (for example, the encrypted information 47, the first encrypted information 47A, the second encrypted information 47B, the third encrypted information 47C, and the fourth encrypted information 47D) generated by encrypting the software identification information, using the recording medium identification information as a key. The control apparatus is equipped with a storage (for example, the storage 51) and a controller (for example, the controller 52) which can access the recording medium and the storage.

The controller can perform the steps of:

obtaining encrypted information from a recording medium (for example, step S3 of FIG. 4, FIG. 5, step S5 of FIG. 10, and FIG. 11);

obtaining recording medium identification information from the recording medium (for example, step S4 of FIG. 4, FIG. 6, step S5 of FIG. 10, and FIG. 11);

obtaining software identification information by decrypting the encrypted information, using the recording medium identification information as a key (for example, step S5 of FIG. 4, FIG. 7, step S5 of FIG. 10, and FIG. 11);

obtaining the software identification information from additional software (for example, step S7 of FIG. 4, FIG. 9, step S7 of FIG. 10, and FIG. 13);

comparing the decrypted software identification information and the software identification information obtained from the additional software (for example, step S7 of FIG. 4, FIG. 9, step S7 of FIG. 10, and FIG. 13); and storing the additional software in a storage if the decrypted software identification information agrees with the software identification information obtained from the additional software, as a result of the comparison between them (for example, step S9 of FIG. 4, step S9 of FIG. 10, step S9 of FIG. 12).

In the present control apparatus, if the decrypted software identification information agrees with the software identification information obtained from the additional software as a result of the comparison between them, the additional software is stored in the storage.

As described above, the additional software is made usable only in the case that the decrypted software identification information agrees with the software identification information obtained from the additional software as a result of the comparison between them. Thus, only in the case that the recording medium storing the correct encrypted information is used, the additional software is installed in the control apparatus and is made usable.

8. Other Embodiments

In the above, the plurality of embodiments of the present invention are described; however, the present invention is not limited to the above embodiments, and various modifications can be made without departing from the gist of the invention. In particular, it is possible to arbitrarily combine the plurality of embodiments and the modified examples described herein, as needed.

For example, the second embodiment and third embodiment can be combined with each other.

For example, the fifth embodiment and the sixth embodiment can be combined with each other. In this case, each of the plural pieces of additional software in the memory card has a plurality of software IDs.

INDUSTRIAL APPLICABILITY

The present invention can be applied to the control apparatus in which additional software is installed from a connected recording medium, and can be applied to the control apparatus system in which the control apparatus is used.

DESCRIPTION OF SYMBOLS

1 PLC system
11 control apparatus
21 recording medium
41 additional software
41A first additional software
41B second additional software
41C additional software
43a software ID
43b software ID
43A first software ID
43B second software ID
43C third software ID
43D fourth software ID
47 encrypted information
47A first encrypted information
47B second encrypted information
47C third encrypted information
47D fourth encrypted information
49 protected area
51 storage
52 controller
53 decryption unit
55 encryption unit
57 comparison determination unit
59 enabling/disabling unit
100 control system

The invention claimed is:

1. A control apparatus system comprising:
a non-transitory computer-readable recording medium storing: additional software additional to a program of the control apparatus system, the additional software comprising software identification information; recording medium identification information; and encrypted information generated by encrypting the software identification information, using the recording medium identification information as a key; and
a programmable logic controller connected to the recording medium, the programmable logic controller comprising: a storage; and
a controller capable of accessing the recording medium and the storage, the controller configured with installation software to perform operations comprising:
obtaining the encrypted information from the recording medium;
obtaining the recording medium identification information from the recording medium;
obtaining decrypted software identification information by decrypting the encrypted information, using the recording medium identification information as the key;
obtaining the software identification information from the additional software;
comparing the decrypted software identification information and the software identification information obtained from the additional software;
storing the additional software in the storage when the decrypted software identification information agrees with the software identification information obtained from the additional software as a result of the comparison; and
deleting, after storing the additional software in the storage, the encrypted information, the recording medium identification information, and the software identification information, from the recording medium and from the storage, wherein the additional software is rendered usable only when the recording medium storing the correct encrypted information is used based on the comparison between the decrypted software identification information and the software identification information from the additional software.

2. The control apparatus system according to claim 1, wherein the additional software comprises a plurality of pieces of additional software.

3. The control apparatus system according to claim 1, wherein the software identification information comprises a plurality of pieces of software information, and
the encrypted information comprises a plurality of pieces of encrypted information corresponding to a number of the plurality of pieces of the software identification information.

4. The control apparatus system according to claim 1, wherein the controller is configured with the installation software to perform operations further comprising deleting, after storing the additional software in the storage, the additional software stored in the recording medium.

* * * * *